US010425546B2

(12) United States Patent
Oguchi et al.

(10) Patent No.: US 10,425,546 B2
(45) Date of Patent: Sep. 24, 2019

(54) PRINTING SYSTEM, AND PRINTER AND COMPUTER-READABLE MEDIUM THEREFOR

(71) Applicant: BROTHER KOGYO KABUSHIKI KAISHA, Nagoya-shi, Aichi-ken (JP)

(72) Inventors: Tomoya Oguchi, Aichi (JP); Kazutaka Yamada, Nagakute (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 15/437,674

(22) Filed: Feb. 21, 2017

(65) Prior Publication Data

US 2017/0289380 A1    Oct. 5, 2017

(30) Foreign Application Priority Data

Mar. 31, 2016    (JP) ................. 2016-070000

(51) Int. Cl.
*H04N 1/00* (2006.01)
*G06F 3/12* (2006.01)
*H04N 1/32* (2006.01)

(52) U.S. Cl.
CPC ....... *H04N 1/00925* (2013.01); *G06F 3/1213* (2013.01); *G06F 3/1219* (2013.01); *G06F 3/1274* (2013.01); *G06F 3/1285* (2013.01); *H04N 1/00037* (2013.01); *H04N 1/00082* (2013.01); *H04N 1/00204* (2013.01); *H04N 1/00973* (2013.01); *H04N 1/32593* (2013.01); *H04N 2201/0094* (2013.01); *H04N 2201/3205* (2013.01); *H04N 2201/3222* (2013.01)

(58) Field of Classification Search
CPC combination set(s) only.
See application file for complete search history.

(56) References Cited

U.S. PATENT DOCUMENTS

| 2004/0184081 | A1* | 9/2004 | Yamamoto | G06F 3/1212 |
| | | | | 358/1.15 |
| 2004/0190014 | A1* | 9/2004 | Ferlitsch | G06K 15/00 |
| | | | | 358/1.5 |
| 2008/0098396 | A1* | 4/2008 | Ebuchi | G06F 3/1207 |
| | | | | 718/102 |
| 2009/0244621 | A1* | 10/2009 | Young | G06K 15/005 |
| | | | | 358/1.16 |
| 2013/0100493 | A1* | 4/2013 | Otsuka | G06F 3/12 |
| | | | | 358/1.15 |

(Continued)

FOREIGN PATENT DOCUMENTS

JP    2000-163225 A    6/2000

*Primary Examiner* — Helen Zong
(74) *Attorney, Agent, or Firm* — Merchant & Gould P.C.

(57) ABSTRACT

A printing system includes a printer configured to perform an issuance process of issuing a cancel notification in response to detecting a cancel trigger, and a non-transitory computer-readable medium storing computer-readable instructions that, when executed by a processor connected with a communication interface, cause the processor to cancel a generating process of generating print data and a print instruction process of transmitting print instruction information to the printer via the communication interface, in response to acquiring the cancel notification issued by the printer, during the generating process.

17 Claims, 15 Drawing Sheets

(56) References Cited

U.S. PATENT DOCUMENTS

| | | | |
|---|---|---|---|
| 2013/0286427 A1* | 10/2013 | Tomomatsu | G06K 15/1809 |
| | | | 358/1.14 |
| 2015/0036182 A1* | 2/2015 | Nakamura | G06F 3/1207 |
| | | | 358/1.15 |
| 2015/0334581 A1* | 11/2015 | Minakawa | H04W 8/005 |
| | | | 370/254 |
| 2018/0007235 A1* | 1/2018 | Kakutani | G06K 15/005 |

* cited by examiner

| 2nd AUTHENTICATION INFORMATION | THRESHOLD INFORMATION | NUMBER-OF-SHEETS INFORMATION |
|---|---|---|
| abc | 1000 | 325 |
| xyz | 500 | 48 |
| ⋮ | ⋮ | ⋮ |

FIG. 1C

| TERMINAL ID | 1st AUTHENTICATION INFORMATION |
|---|---|
| Term-A | abc |
| ⋮ | ⋮ |

FIG. 1D

| | | |
|---|---|---|
| PUBLIC INFORMATION | SIZE INFORMATION | A4 |
| | COLOR INFORMATION | COLOR |
| PRIVATE INFORMATION | TRAY INFORMATION | TRAY 1 |
| | SHEET INFORMATION | PLAIN PAPER |
| | MARGIN INFORMATION | MARGINED |
| | 1st AUTHENTICATION INFORMATION | abc |

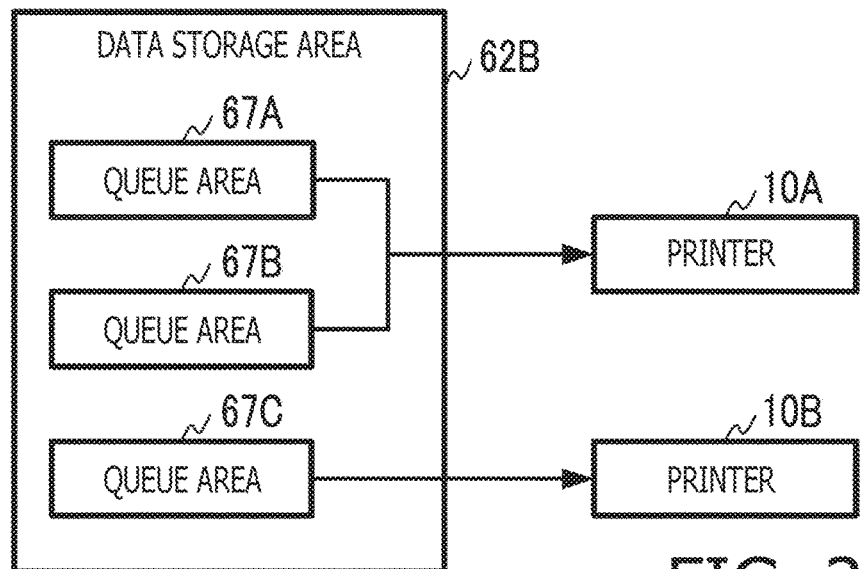

FIG. 3A

| JOB ID | INSTRUCTION INFORMATION | 67A |
|---|---|---|
| CONTENTS DATA A | CONVEYANCE INSTRUCTION INFORMATION | TRANSMISSION SEQUENCE |
| | INK DISCHARGE INSTRUCTION INFORMATION | |
| | SHEET DISCHARGE INSTRUCTION INFORMATION | |
| CONTENTS DATA B | FEEDING INSTRUCTION INFORMATION | |
| | CUEING INSTRUCTION INFORMATION | |

FIG. 3B

| JOB ID | INSTRUCTION INFORMATION | 67A |
|---|---|---|
| _PREPARATION_ | PREPARATION INSTRUCTION INFORMATION | |

FIG. 3C

PRINTING SYSTEM, AND PRINTER AND COMPUTER-READABLE MEDIUM THEREFOR

CROSS-REFERENCE TO RELATED APPLICATION

This application claims priority under 35 U.S.C. § 119 from Japanese Patent Application No. 2016-070000 filed on Mar. 31, 2016. The entire subject matter of the application is incorporated herein by reference.

BACKGROUND

Technical Field

The following description relates to one or more aspects of a printing system that includes an information processing terminal and a printer configured to perform a printing operation in accordance with instructions from the information processing terminal.

Related Art

Heretofore, a host computer has been known that is configured to provide an instruction to perform pre-printing preparations to a printer, then generate print data, and transmit the generated print data to the printer. Meanwhile, the printer performs head maintenance in accordance with the instruction to perform pre-printing preparations received from the host computer, and perform a printing operation in accordance with the print data received from the host computer.

SUMMARY

Thus, the printer begins to perform pre-printing preparations (e.g., the head maintenance) before receiving the print data from the host computer. Therefore, for instance, when a printing operation is cancelled at the printer that is performing the head maintenance, the printer is obliged to continue to receive, from the host computer, print data for the cancelled printing operation. Accordingly, it might cause wasteful consumption of a resource of the printer and might interrupt other operations being or to be executed by the printer.

Aspects of the present disclosure are advantageous to provide one or more improved techniques, for a printing system, which make it possible to prevent transmission of useless print data to a printer included in the printing system.

According to aspects of the present disclosure, a printing system is provided that includes a printer and a non-transitory computer-readable medium. The medium stores computer-readable instructions that are executable by a processor connected with a first communication interface. The instructions are configured to, when executed by the processor, cause the processor to perform a preparation instruction process including transmitting preparation instruction information to the printer via the first communication interface, the preparation instruction information including information that instructs the printer to perform a pre-printing operation, the pre-printing operation being an operation to be performed by the printer to print an image with particular quality on a sheet in a printing operation, perform a generating process in response to performing the preparation instruction process, the generating process including generating print data based on image data specified by a user, a print instruction process including transmitting print instruction information to the printer via the first communication interface, the print instruction information being for instructing the printer to perform the printing operation based on the generated print data, and perform a cancelling process in response to acquiring during the generating process a cancel notification issued by the printer, the cancelling process including cancelling the generating process and the print instruction process. The printer includes an operating unit configured to perform the pre-printing operation and the printing operation, a second communication interface, and a controller configured to perform a first receiving process including receiving the preparation instruction information from the processor via the second communication interface, perform a pre-printing process in response to receiving the preparation instruction information, the pre-printing process including controlling the operating unit to perform the pre-printing operation, perform a second receiving process including receiving the print instruction information from the processor via the second communication interface, perform a print process in response to receiving the print instruction information and terminating the pre-printing process, the print process including controlling the operating unit to perform the printing operation in accordance with the print instruction information, and perform an issuance process in response to detecting a cancel trigger for cancelling an operation being performed by the printing system, the issuance process including issuing the cancel notification.

According to aspects of the present disclosure, further provided is a printer including an operating unit configured to perform a pre-printing operation and a printing operation, the pre-printing operation being an operation to be performed to print an image with particular quality on a sheet in the printing operation, a communication interface, and a controller configured to perform a first receiving process including receiving preparation instruction information from an information processing device via the communication interface, the preparation instruction information including information that instructs the printer to perform the pre-printing operation, perform a pre-printing process in response to receiving the preparation instruction information, the pre-printing process including controlling the operating unit to perform the pre-printing operation, perform a second receiving process including receiving print instruction information from the information processing device via the communication interface, the print instruction information being for instructing the printer to perform the printing operation based on print data, perform a print process in response to receiving the print instruction information and terminating the pre-printing process, the print process including controlling the operating unit to perform the printing operation in accordance with the print instruction information, and perform an issuance process in response to detecting a cancel trigger for cancelling an operation in execution, the issuance process including issuing a cancel notification.

According to aspects of the present disclosure, further provided is a non-transitory computer-readable medium storing computer-readable instructions that are executable by a processor connected with a communication interface, the instructions being configured to, when executed by the processor, cause the processor to perform a preparation instruction process including transmitting preparation instruction information to a printer via the communication interface, the preparation instruction information including information that instructs the printer to perform a pre-printing operation, the pre-printing operation being an operation to be performed by the printer to print an image with particular quality on a sheet in a printing operation, perform a generating process in response to performing the preparation instruction process, the generating process including generating print data based on image data specified by a user, a print instruction process including transmitting print instruction information to the printer via the communication interface, the print instruction information being for instructing the printer to perform the printing operation based on the generated print data, and perform a cancelling process in response to acquiring during the generating process a cancel notification issued by the printer, the cancelling process including cancelling the generating process and the print instruction process.

BRIEF DESCRIPTION OF THE ACCOMPANYING DRAWINGS

FIG. 1A schematically shows a configuration of a printing system in an illustrative embodiment according to one or more aspects of the present disclosure.

FIG. 1B is a block diagram schematically showing an electrical configuration of a printer included in the printing system in the illustrative embodiment according to one or more aspects of the present disclosure.

FIG. 1C exemplifies an authentication information list stored in an EEPROM of the printer in the illustrative embodiment according to one or more aspects of the present disclosure.

FIG. 1D exemplifies a cancel list stored in the EEPROM of the printer in the illustrative embodiment according to one or more aspects of the present disclosure.

FIG. 3A shows a correspondence relationship between printers and queue areas of the data storage area in the illustrative embodiment according to one or more aspects of the present disclosure.

FIG. 3B shows a particular one of the queue areas in which print instruction information is stored, in the illustrative embodiment according to one or more aspects of the present disclosure.

FIG. 3C shows the particular queue area in which preparation instruction information is stored, in the illustrative embodiment according to one or more aspects of the present disclosure.

Figures 10A, 10B:
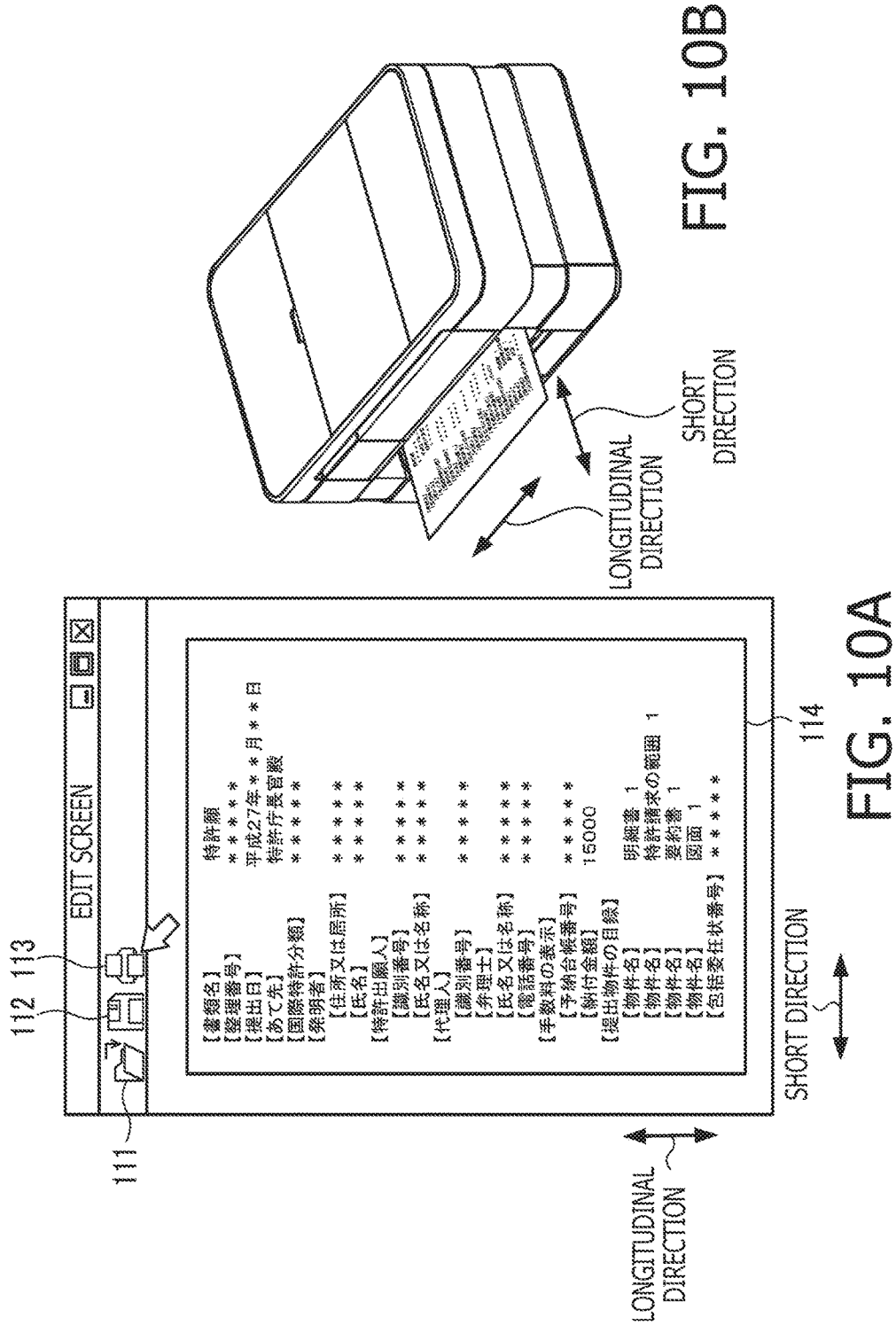

FIG. 10A exemplifies an edit screen displayed on a display of the information processing terminal in the illustrative embodiment according to one or more aspects of the present disclosure.

FIG. 10B shows a state in which a sheet is discharged from the printer in the illustrative embodiment according to one or more aspects of the present disclosure.

Figure 11:
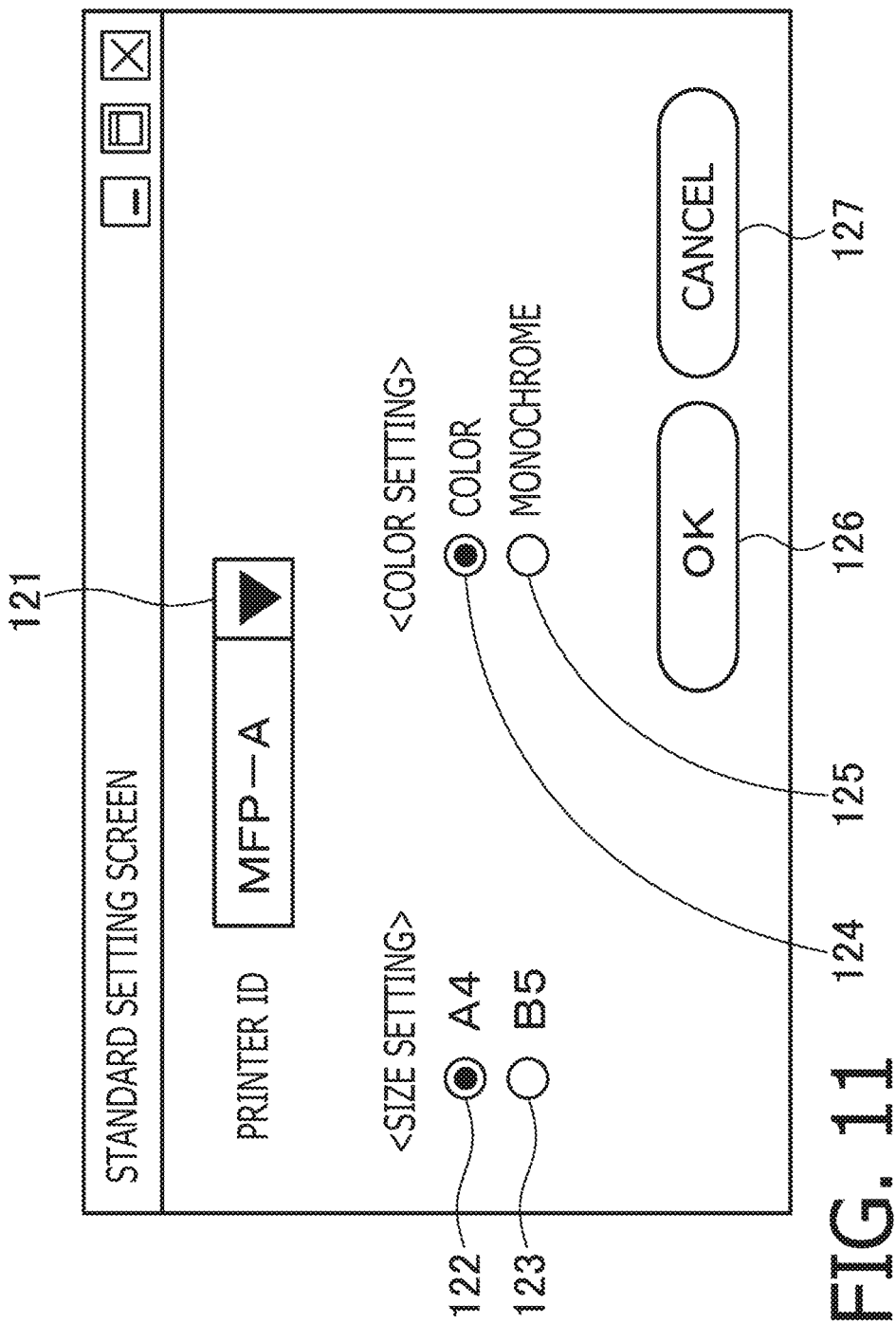

FIG. 11 exemplifies a standard setting screen displayed on the display of the information processing terminal in the illustrative embodiment according to one or more aspects of the present disclosure.

Figure 12:
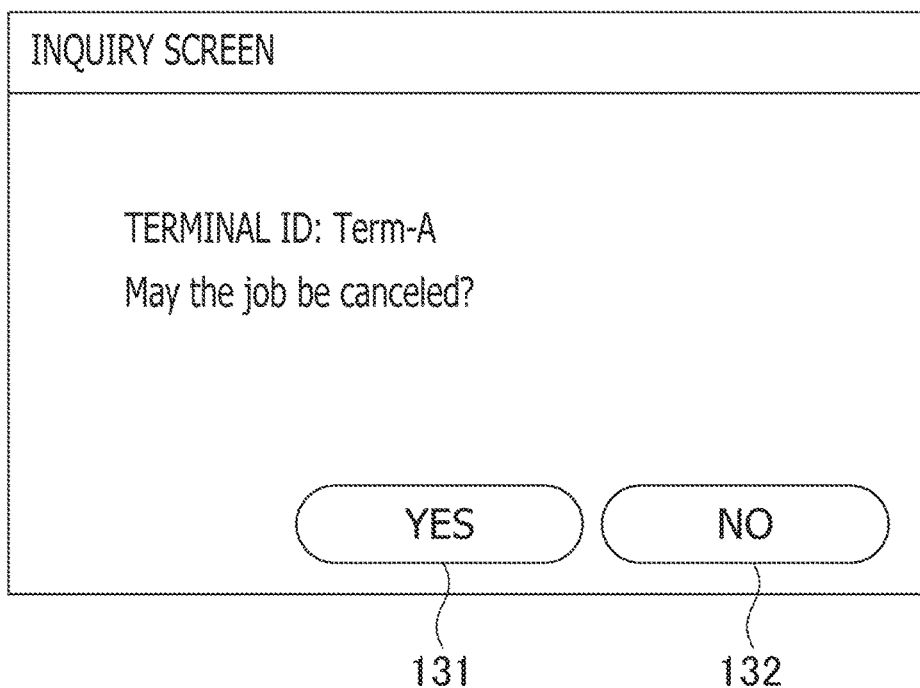

FIG. 12 exemplifies an inquiry screen displayed on a display of the printer in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1A:
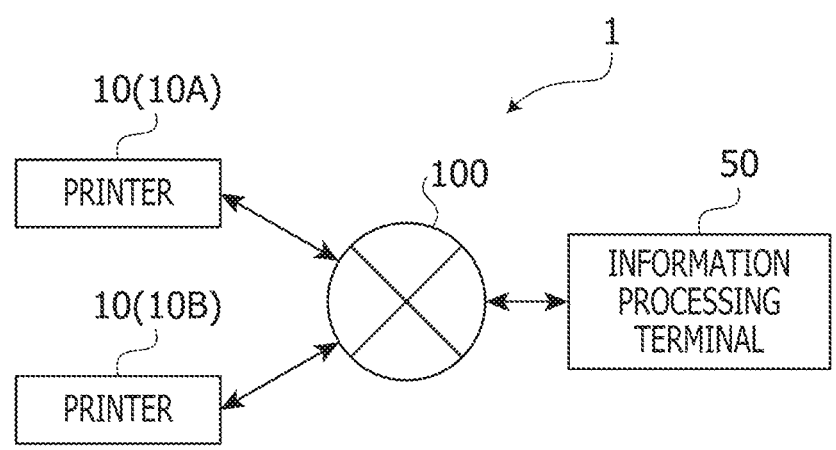

Hereinafter, an illustrative embodiment according to aspects of the present disclosure will be described with reference to the accompanying drawings. As shown in FIG. 1A, for instance, a printing system 1 of the illustrative embodiment includes a printer 10 (see FIG. 1B) and an information processing terminal 50 (see FIG. 2A). The printer 10 and the information processing terminal 50 are configured to communicate with each other via a communication network 100. For example, the communication network 100 may include, but is not limited to, a wired LAN, a wireless LAN, and a USB cable. Further, for instance, as shown in FIG. 1A, the printing system 1 may include a plurality of printers 10A and 10B. Namely, as shown in FIG. 3A, the information processing terminal 50 may be communicable with the plurality of printers 10A and 10B.

Figure 1B:
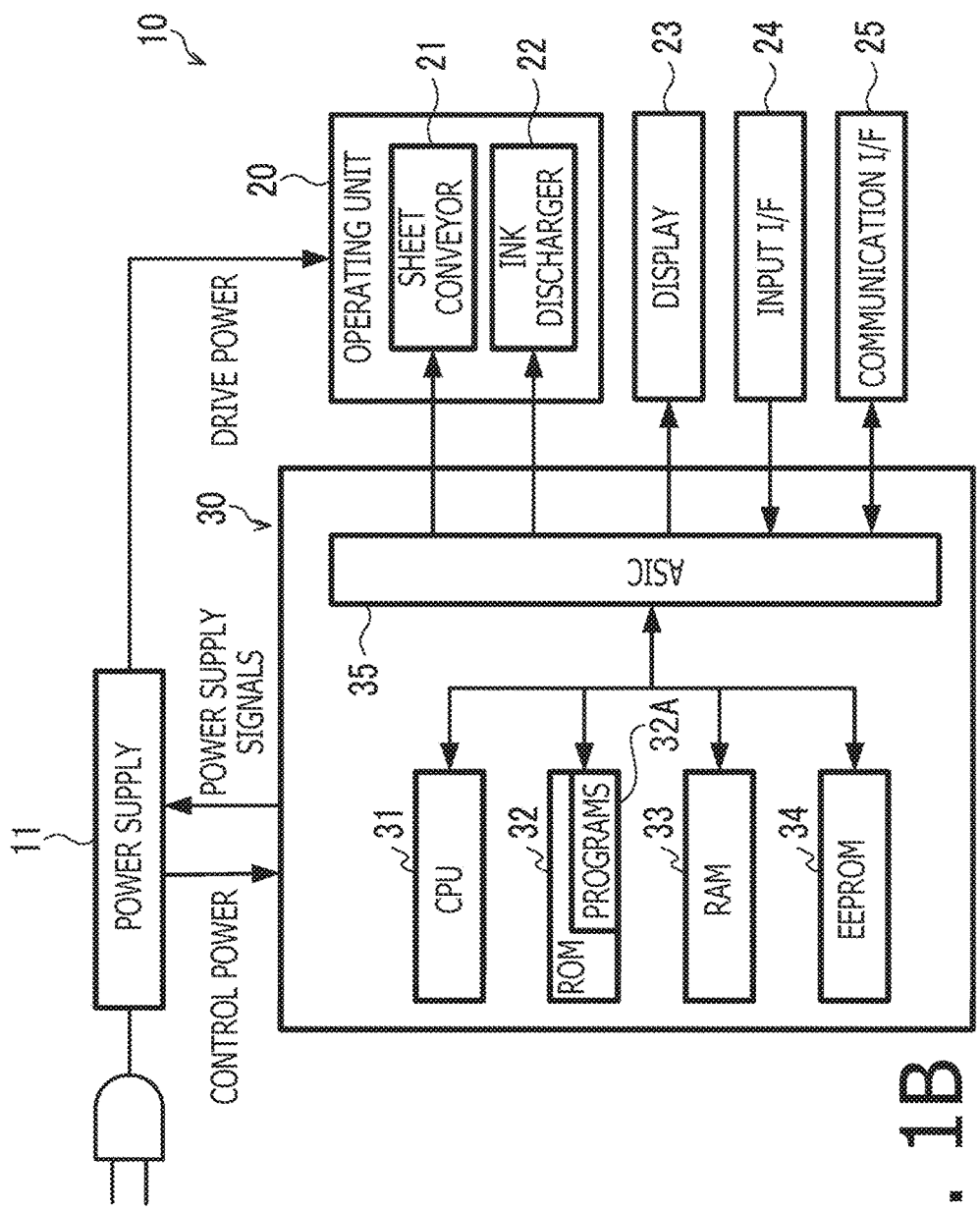

For instance, a maker or a vendor provides a user with a set of the printer 10 shown in FIG. 1B and a driver program 66 installable in the information processing terminal 50. Then, when the driver program 66 is installed into the information processing terminal 50 by the user, the printing system 1 of the illustrative embodiment is established. For instance, the driver program 66 may be provided to the user in a form stored in a CD-ROM contained in a package of the printer 10, or may be downloadable from a website of the maker or the vendor.

As shown in FIG. 1B, the printer 10 includes a power supply 11, an operating unit 20, a display 23, an input I/F ("I/F" is an abbreviated form of interface) 24, a communication I/F 25, and a controller 30. Elements included in the printer 10 are interconnected via a communication bus. In the illustrative embodiment, the printer 10 is exemplified as an inkjet printer. Nonetheless, a printing method of the printer 10 is not limited to the inkjet method but may include any of known methods such as an electrophotographic method. The printers 10A and 10B shown in FIG. 3A may have substantially the same configuration as exemplified in FIG. 1B.

The power supply 11 is configured to supply each element included in the printer 10 with an electric power supplied from an external power source via a power plug. Specifically, the power supply 11 outputs an electric power received from the external power source to the operating unit 20 as a drive power (e.g., 24 V) and to the controller 30 as a control power (e.g., 5V). Further, although the following features are not shown in any drawings, the power supply 11 is further configured to supply an electric power to the display 23, the input I/F 24, and the communication I/F 25.

Further, the power supply 11 is switchable between a drive state and a dormant state in accordance with a power supply signal output from the controller 30. More specifically, the controller 30 switches the power supply 11 from the dormant state to the drive state by outputting a power supply signal of a "HIGH" level (e.g., 5V). Further, the controller 30 switches the power supply 11 from the drive state to the dormant state by outputting a power supply signal of a "LOW" level (e.g., 0V).

The drive state is a state where the power supply 11 is outputting the drive power to the operating unit 20. In other words, the drive state is a state where the operating unit 20 is enabled to operate. The dormant state is a state where the power supply 11 is not outputting the drive power to the operating unit 20. In other words, the dormant state is a state where the operating unit 20 is not enabled to operate. In the meantime, the power supply 11 outputs the control power to the controller 30 regardless of whether the power supply 11 is in the drive state or the dormant state. Further, although the following features are not shown in any drawings, the input I/F 24 is configured to output an operation signal according to a user operation, regardless of whether the power supply 11 is in the drive state or the dormant state. Moreover, the communication I/F 25 is configured to receive information from external devices regardless of whether the power supply 11 is in the drive state or the dormant state.

The operating unit 20 performs a printing operation and pre-printing operations in accordance with instructions from the controller 30. The printing operation is an operation of printing an image on a sheet. The pre-printing operations are operations to be performed in advance of the printing operation so as to print the image with particular quality on the sheet in the printing operation. The printing operation and the pre-printing operations will be described in detail below. As shown in FIG. 1B, the operating unit 20 includes a sheet conveyor 21 and an ink discharger 22.

The sheet conveyor 21 is configured to convey a sheet placed on a feed tray (not shown) in a conveyance direction. For instance, the sheet conveyor 21 includes a plurality of rollers configured to rotate in response to receiving a driving force from a motor (not shown). The plurality of rollers driven by the motor convey the sheet placed on the feed tray to a position to face the ink discharger 22, and discharge the sheet with an image printed thereon by the ink discharger 22 outside the printer 10. The printer 10 may have a plurality of feed trays.

The ink discharger 22 is configured to move along a main scanning direction perpendicular to the conveyance direction, in a position where the ink discharger 22 faces the sheet being conveyed by the sheet conveyor 21. The ink discharger 22 moves along the main scanning direction in response to receiving the driving force from the motor (not shown). In a lower surface of the ink discharger 22, a nozzle surface is formed with a plurality of nozzles arranged therein. The ink discharger 22 discharges ink droplets from the nozzles.

When ink droplets, which are discharged from the ink discharger 22 while the ink discharger 22 is moving along the main scanning direction, land on the sheet, an image is printed on the sheet. An area on the sheet within which ink droplets discharged from the ink discharger 22 during the movement of the ink discharger 22 from one side to the other side along the main scanning direction are allowed to land may be referred to as a "printing area." The sheet is sectioned into a plurality of printing areas. In a below-mentioned printing operation, the ink discharger 22 sequentially prints an image in each of the plurality of printing areas.

For example, the display 23 may include, but is not limited to, a liquid crystal display, an organic electroluminescence display, and the like. The display 23 has a display screen for displaying various kinds of information.

The input I/F 24 is configured to accept an input operation by the user. Specifically, the input I/F 24 includes operable buttons, and is configured to, when one of the buttons is pressed, transmit an operation signal corresponding to the pressed button to a CPU 31. Further, the input I/F 24 may include a membranous touch sensor superimposed on the display screen of the display 23.

The touch sensor of the input I/F 24 is configured to output positional information indicating a position on the display screen that the user has touched. According to aspects of the present disclosure, "touching" may include, but is not limited to, every operation of bringing an input medium into touch with the display screen. Further, "touching" may conceptionally include an operation (e.g., hovering or a floating touch) of bringing the input medium in proximity to the display screen. Namely, in this case, the input medium may not necessarily be brought into contact with the display screen. Further, for example, the input medium may include, but is not limited to, a finger of the user, a stylus, a touch pen, and the like.

The communication I/F 25 is configured to communicate with external devices via the communication network 100. Namely, the printer 10 transmits various kinds of information to external devices via the communication I/F 25, and receives various kinds of information from external devices via the communication I/F 25. For instance, the communication I/F 25 may be an interface for communicating wireless signals in accordance with a wireless communication protocol based on Wi-Fi (trademark) standards or may be an interface connectable with a LAN cable and/or a USB cable.

The controller 30 is configured to take overall control of the printer 10. As shown in FIG. 1B, the controller 30 is a microcomputer including the CPU 31, a ROM 32, a RAM 33, an EEPROM 34, and an ASIC 35.

The ROM 32 stores therein computer programs 32A for the CPU 31 to control operations of the printer 10. The RAM 33 is used as a storage area and/or a work area to temporarily store various kinds of data used when the CPU 31 executes the computer programs 32A stored in the ROM 32. The EEPROM 34 stores therein settings and flags to be held even after the printer 10 is turned off. The CPU 31 controls operations of the printer 10 by executing the computer programs 32A read out from the ROM 32. The ASIC 35 is connected with the sheet conveyor 21, the ink discharger 22, the display 23, the input I/F 24, and the communication I/F 25. The ASIC 35 is configured to operate each of elements included in the printer 10 in accordance with instructions from the CPU 31.

The ROM 32, the RAM 33, and the EEPROM 34 may be replaced with computer-readable storage media. The computer-readable storage media may include non-transitory media. The non-transitory media may include recording media such as CD-ROMs and DVD-ROMs other than the aforementioned examples. Further, the non-transitory media may include tangible media. On the other hand, electric signals carrying programs downloaded from a server on the Internet are computer-readable signal media, which are included in computer-readable media but not included in the non-transitory computer-readable media. The same applies to a below-mentioned memory 62 of the information processing terminal 50.

For instance, as shown in FIG. 1C, the EEPROM 34 may store an authentication information list. The authentication information list may include one or more authentication information records. Each authentication information record may include second authentication information, threshold information, and number-of-sheets information. The controller 30 is configured to register, onto the authentication information list, an authentication information record input via the input I/F 24 and an authentication information record received from an external device via the communication I/F 25.

The second authentication information indicates ownership of an authority to cause the printer 10 to perform a printing operation. For instance, the second authentication information may be a user ID for logging in to the information processing terminal 50 or may be an arbitrary character string set by the user of the information processing terminal 50. The threshold information indicates an upper limit (hereinafter referred to as a "threshold number of sheets") of the number of sheets printable in accordance with print instruction information that includes first authentication information identical to the corresponding second authentication information. The number-of-sheets information indicates a cumulative number of sheets printed in accordance with print instruction information that includes the first authentication information identical to the corresponding second authentication information. Namely, the authentication information record registered in the first line of the authentication information list shown in FIG. 1C represents that it is possible to perform printing on 1000 sheets in accordance with print instruction information including first authentication information "abc" and that 325 sheets have been printed until the present time.

Further, for instance, as shown in FIG. 1D, the EEPROM 34 may store a cancel list. The cancel list may include one or more cancel records. Each cancel record may include a terminal ID and first authentication information. The first authentication information is received from the information processing terminal 50 identified by the corresponding terminal ID.

In response to detecting a below-mentioned cancel trigger, the controller 30 registers a cancel record for a cancelled operation onto the cancel list. The cancel list is stored in an area of the EEPROM 34 that is referable from the information processing terminal 50 connected with the printer 10 via the communication network 100. In other words, the information processing terminal 50 is allowed to acquire the cancel list from the EEPROM 34 of the printer 10 via the communication network 100.

The ASIC 35 outputs a drive signal to the motor (not shown). When the motor rotates, the sheet conveyor 21 conveys a sheet, and the ink discharger 22 moves in the main scanning direction. The ASIC 35 outputs a drive signal to a drive element such as a piezoelectric element. When the drive element vibrates, the ink discharger 22 discharges ink droplets from the nozzles. The ASIC 32 outputs an image signal to the display 23 and causes the display 23 to display a screen image thereon. The ASIC 35 acquires an operation signal output from the input I/F 24. The ASIC 35 receives information from an external device via the communication I/F 25, and transmits information to an external device via the communication I/F 25.

Figures 2A, 2B:
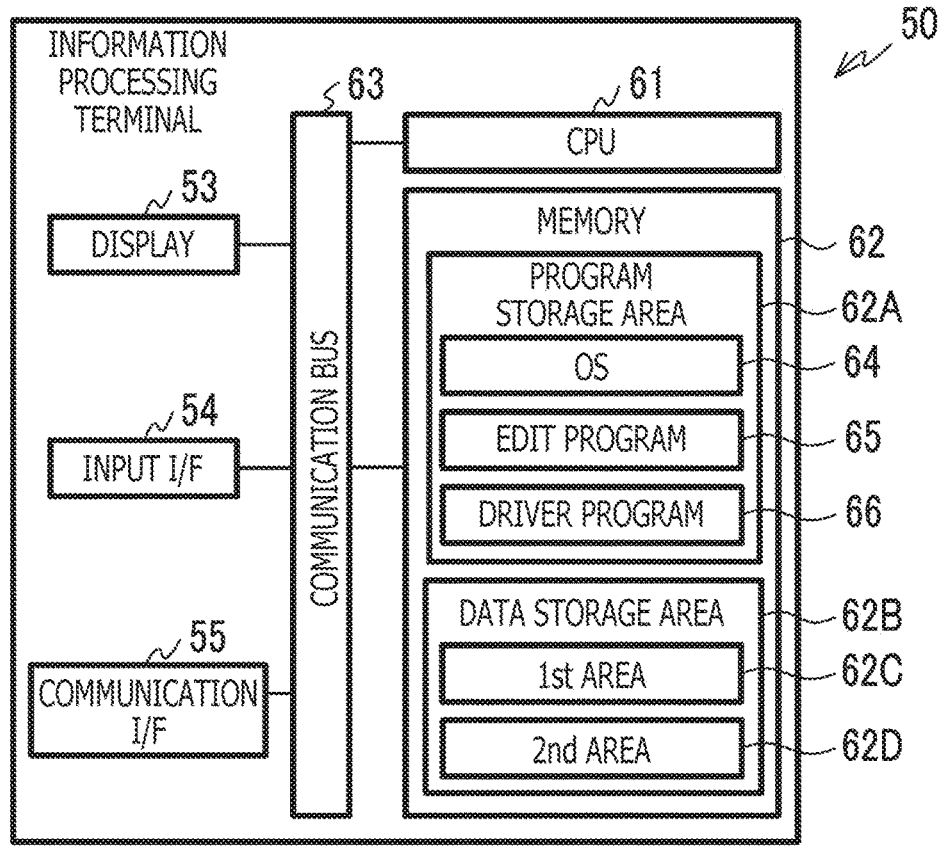
FIG. 2A is a block diagram schematically showing an electrical configuration of an information processing terminal included in the printing system in the illustrative embodiment according to one or more aspects of the present disclosure.
FIG. 2B shows condition information stored in a data storage area of the information processing terminal in the illustrative embodiment according to one or more aspects of the present disclosure.
Figure 4:
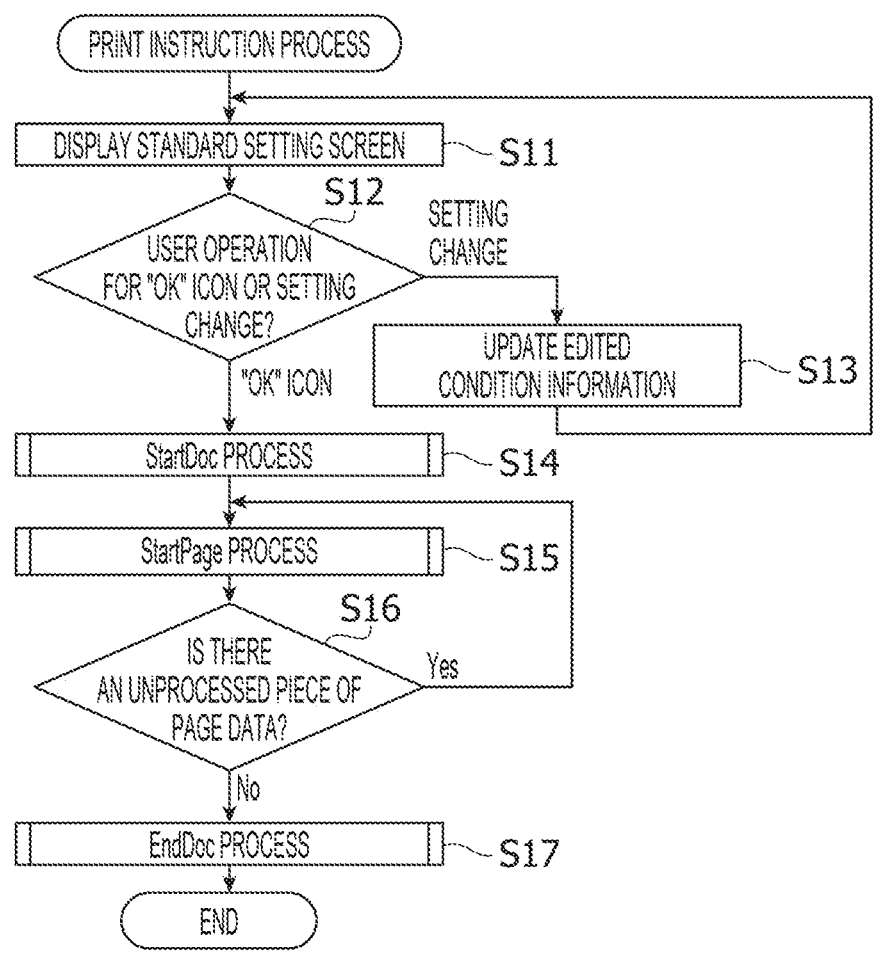
FIG. 4 is a flowchart showing a procedure of a print instruction process to be executed by the information processing terminal in the illustrative embodiment according to one or more aspects of the present disclosure.

As shown in FIG. 2A, the information processing terminal 50 includes a display 53, an input I/F 54, a communication I/F 55, a CPU 61, a memory 62, and a communication bus 63. The display 53, the input I/F 54, the communication I/F 55, and the CPU 61 included in the information processing terminal 50 are configured substantially in the same manner as the display 23, the input I/F 24, the communication I/F 25, and the CPU 31 included in the printer 10, respectively. Therefore, explanations of the display 53, the input I/F 54, the communication I/F 55, and the CPU 61 will be omitted. Within the communication network 100, the information processing terminal 50 is definitely identified by a terminal ID "Term-A." For example, the terminal ID may include, but is not limited to, a computer name, an IP address, a MAC address, and the like.

For example, the information processing terminal 50 may include, but is not limited to, a mobile phone, a smartphone, a tablet terminal, a personal computer, and the like. For instance, the input I/F 54 of the information processing terminal 50 may include a combination of a mouse and a keyboard.

For instance, the memory 62 may include at least one of a RAM, a ROM, an EEPROM, an HDD, a portable storage medium (e.g., a USB memory) detachably attached to the information processing terminal 50, a buffer of the CPU 61, and a combination including at least two of the above-cited storage media. The memory 62 includes a program storage area 62A and a data storage area 62B. In the program storage area 62A, an operating system (hereinafter referred to as an "OS") 64, and an edit program 65, and a driver program 66 are installed. Each program stored in the program storage area 62A may be a single program or an aggregate of a plurality of programs. In the data storage area 62B, data and/or information necessary for execution of each program stored in the program storage area 62A is stored.

In the illustrative embodiment, Windows (trademark) OS is specifically exemplified as the OS 64. Nonetheless, for example, the OS 64 may include, but is not limited to, Android (trademark) OS and iOS (trademark), as well as Windows OS.

The edit program 65 is a program for editing contents data in accordance with user operations. As exemplified in FIG. 10A, the edit program 65 causes the display 53 to display an image represented by specified contents data, accepts user operations to provide an instruction to edit the contents data via the input I/F 54, and edits the contents data in accordance with the accepted user operations. Exemplary formats of the contents data may include, but are not limited to, a text format, an image format, a spreadsheet format, and a presentation format. The contents data may contain at least one piece of page data. A piece of page data represents contents to be printed on a single sheet.

Figure 5:
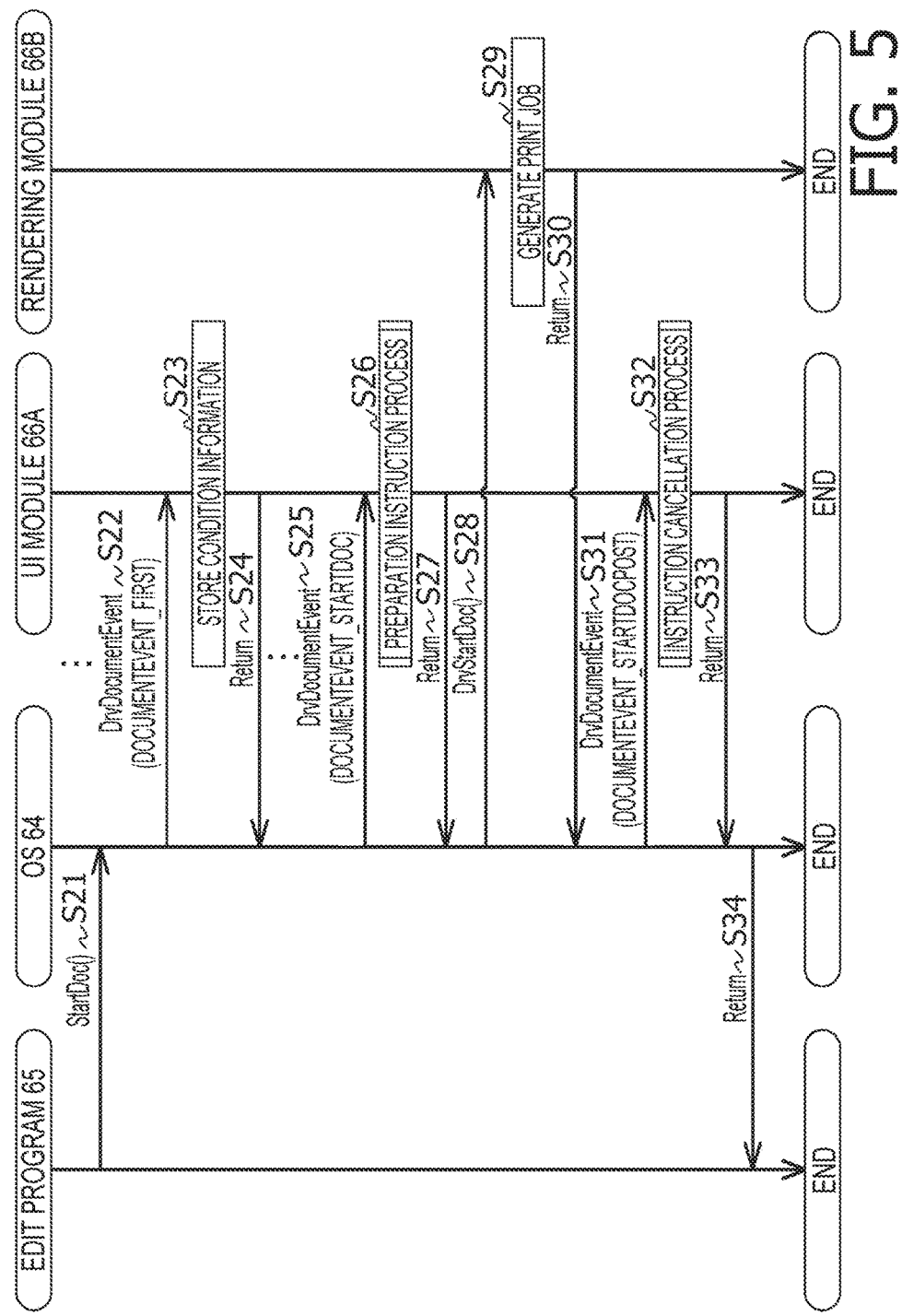
FIG. 5 is a flowchart showing a procedure of a StartDoc process to be executed by the information processing terminal in the illustrative embodiment according to one or more aspects of the present disclosure.
Figure 6:
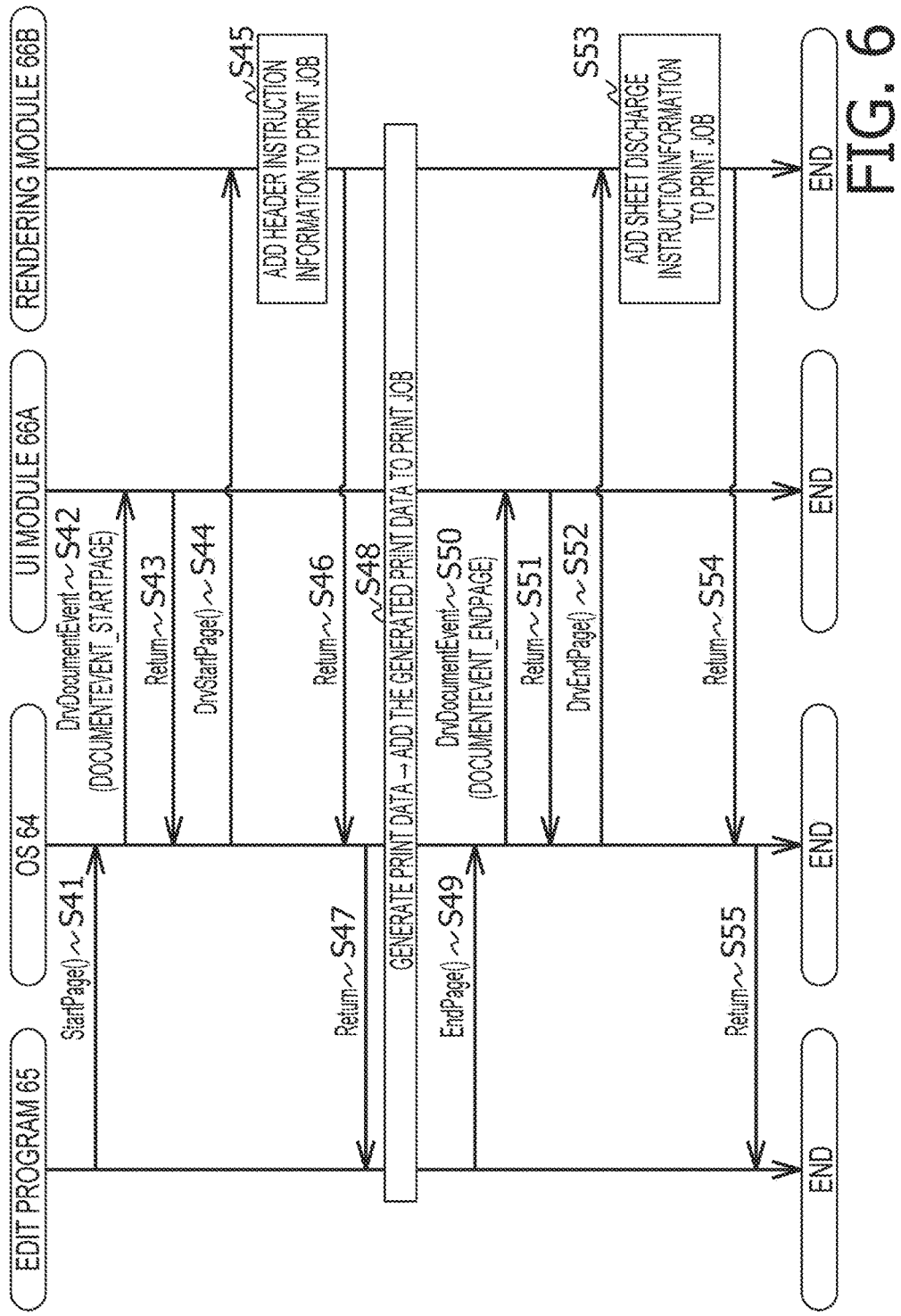
FIG. 6 is a flowchart showing a procedure of a StartPage process to be executed by the information processing terminal in the illustrative embodiment according to one or more aspects of the present disclosure.

The driver program 66 is for causing the printer 10 to perform a printing operation in accordance with a print instruction received from the OS 64. In the illustrative embodiment, as shown in FIGS. 5 and 6, the driver program 66 includes a UI module 66A and a rendering module 66B. Nonetheless, the driver program 66 may include only a single module or may further include another module. The driver program 66 may be configured to provide an instruction to perform a printing operation only to the printer 10 of a single model or to the printers 10 of a plurality of models.

In the driver program 66, a plurality of functions specified by the OS 64 are defined. The driver program 66 is configured to cause the printer 10 to perform a printing operation in response to the plurality of functions being invoked in a particular order by the OS 64. In the illustrative embodiment, for instance, the print instruction represents that a first function "DrvDocumentEvent( )" defined by the UI module 66A is invoked by the OS 64 with a constant "DOCUMENT-EVENT_STARTDOC" as an argument.

As shown in FIG. 2A, the data storage area 62B includes a first area 62C and a second area 62D. For instance, the first area 62C is a so-called registry as a database containing basic information regarding the OS 64 and/or setting information for the driver program 66. A reference procedure for referring to information stored in the first area 62C is defined by the OS 64. The OS 64 guarantees the correctness of information referred to in accordance with the reference procedure, but does not guarantee the correctness of information referred to without following the reference procedure. In contrast, the information stored in the second area 62D may be referred to at arbitrary timing with no need to follow any reference procedure. In the following description, when an expression such as "a program stores information into the area 62B" is used, it generally represents that the information is stored into the second area 62D. An example of the reference procedure for referring to the information stored in the first area 62C will be described below.

For example, the edit program 65 secures a particular memory area in the second area 62D. Then, the edit program 65 invokes a read function defined by the OS 64 with a first pointer "DEVMODE" as an argument. The first pointer "DEVMODE" indicates a head address of the secured memory area. The OS 64 makes a copy of information stored in the first area 62C and stores the copy of the information into the memory area indicated by the first pointer "DEVMODE." Thereby, the edit program 65 is allowed to read or edit the information copied from the first area 62C into the memory area indicated by the first pointer "DEVMODE."

As another example, in the driver program 66, a function (e.g., the first function "DrvDocumentEvent( )") prescribed by the OS 64 is defined. The OS 64 invokes the first function with a constant "DOCUMENTEVENT_FIRST" and a second pointer as arguments. The second pointer indicates a head address of a memory area where the information stored in the first area 62C is stored or a head address of a memory area where information copied from the first area 62C into the second area 62D is stored. The driver program 66 is allowed to read or edit the information stored in the memory area indicated by the second pointer, as information stored in the first area 62C. In the illustrative embodiment, an instruction to execute the first function with the constant "DOCUMENTEVENT_FIRST" and the second pointer specified as arguments may be referred to as a "reference instruction" to permit reference of the information stored in the first area 62C.

For instance, as shown in FIG. 2B, the first area 62C stores therein condition information. The condition information indicates execution conditions for the printer 10 to execute a printing operation. In the illustrative embodiment, the condition information includes size information, color information, tray information, sheet information, margin information, and first authentication information. Nonetheless, specific examples of the condition information are not limited to the examples shown in FIG. 2B. For instance, the first authentication information may not necessarily be included in the condition information.

The condition information is stored into the first area 62C at a timing when the driver program 66 is installed. Further, the driver program 66 is enabled to change the condition information stored in the first area 62C in accordance with a user instruction. More specifically, the driver program 66 reads the condition information out of the first area 62C in accordance with the reference instruction from the OS 64, and displays the read condition information on the display 53. Subsequently, in response to acceptance of a user operation to change the condition information via the input I/F 54, the driver program 66 overwrites the condition information stored in the first area 62C with the changed one.

The condition information contains public information and private information. The public information is editable by the driver program 66 and other programs (e.g., the edit program 65) installed in the information processing terminal 50. The private information is not allowed to be edited by any other programs but the driver program 66 installed in the information processing terminal 50. In other words, the private information is editable only by the driver program 66. As exemplified in FIG. 2B, the size information and the color information are included in the public information. The tray information, the sheet information, the margin information, and the first authentication information are included in the private information.

The size information indicates the size (e.g., "A4" or "B5") of a sheet to be used for the printing operation. The color information indicates the number of inks (e.g., "color" or "monochrome") to be used for the printing operation. The tray information indicates a particular one (e.g., "tray 1" or "tray 2") of the plurality of feed trays of the printer 10. The sheet information indicates a type (e.g., "plain paper" or "glossy paper") of the sheet to be used for the printing operation. The margin information indicates whether to form a particular width of margin at outer edge portions of the sheet in the printing operation (e.g., "margined printing" or "margin-less printing").

A data structure of the public information is defined by the OS 61. Only exemplary items of the public information are shown in FIG. 2B. On the other hand, a data structure of the private information may be different between the plurality of printers 10 or between a plurality of driver programs 66. Hereinafter, an execution condition represented by the public information may be referred to as a "public condition," and an execution condition represented by the private information may be referred to as a "private condition."

The data storage area 62B may include one or more queue areas. In the illustrative embodiment, as shown in FIG. 3A, the data storage area 62B includes a plurality of queue areas 67A, 67B, and 67C. The queue areas 67A to 67C are memory areas where information to be transmitted to the printers 10A and 10B is stored. Each of the queue areas 67A to 67C is associated with a printer port specifically for one of the printers 10A and 10B. In the illustrative embodiment, information to be transmitted to the printer 10A is stored in the queue areas 67A and 67B. In addition, information to be transmitted to the printer 10B is stored in the queue area 67C. Further, for instance, the OS 64 specifies, for the driver program 66, one of the queue areas 67A to 67C to store information as an argument of a function. Hereinafter, a queue area of the queue areas 67A to 67C that is specified for the driver program 66 may be referred to as a "specified queue."

In the queue areas 67A to 67C, information for instructing the printers 10A and 10B to execute various kinds of operations is stored. More specifically, in the queue areas 67A to 67C, print instruction information shown in FIG. 3B, preparation instruction information shown in FIG. 3C, and status transmission instruction information (not shown) are stored. The print instruction information is for instructing the printers 10A and 10B to execute a printing operation. The print instruction information includes authentication instruction information, feeding instruction information, cueing instruction information, conveyance instruction information, ink discharge instruction information, and sheet discharge instruction information. The preparation instruction information is for instructing the printers 10A and 10B to execute the pre-printing operations. The status transmission instruction information (not shown) is for instructing the printers 10A and 10B to transmit status information showing statuses of the printers 10A and 10B. Nonetheless, specific examples of the information stored in the queue areas 67A to 67C are not limited to the aforementioned kinds of information.

The queue area 67A is an area in which one or more pieces of information to be transmitted by the OS 64 to the printer 10A via the communication I/F 55 are stored with a transmission sequence specified therefor. In other words, the OS 64 checks at particular timing whether instruction information is stored in the queue area 67A. In response to determining that instruction information is stored in the queue area 67A, the OS 64 transmits the instruction information to a printer 10 via the communication I/F 55 in a previously-specified transmission sequence, and deletes the transmitted instruction information from the queue area 67A. The same applies to the queue areas 67B and 67C.

More specifically, as shown in FIGS. 3B and 3C, each piece of the instruction information stored in the queue area 67A has a corresponding job ID added thereto. Each job ID is information for identifying instruction information to be sequentially transmitted, from among the instruction information stored in the queue area 67A. Namely, there may be a case where the same job ID is added to a plurality of pieces of instruction information. The OS 64 transmits the plurality of pieces of instruction information with the same job ID added thereto, in the sequence in which the plurality of pieces of instruction information are stored in the queue area 67A. Further, the OS 64 transmits a plurality of pieces of instruction information with different job IDs added thereto, in a sequence in which the job IDs have been generated.

For instance, in the queue area 67A shown in FIG. 3B, the OS 64 first transmits the conveyance instruction information, the ink discharge instruction information, and the sheet discharge instruction information, which have a job ID "contents data A" added thereto, in the aforementioned sequence. Subsequently, the OS 64 transmits the feeding instruction information and the cueing instruction information, which have a job ID "contents data B" added thereto, in this sequence. In this case, even though the feeding instruction information with the job ID "contents data B" added has been written into the queue area 67A earlier than the sheet discharge instruction information with the job ID "contents data A" added, the sheet discharge instruction information is transmitted earlier than the feeding instruction information. Namely, a plurality of pieces of instruction information with the same job ID added thereto are sequentially transmitted in a sequence in which the plurality of pieces of instruction information have been written.

[Operations of System]

Referring to FIGS. 4 to 9, operations of the printing system 1 of the illustrative embodiment will be described.

In the present disclosure, basically, flowcharts show processes to be executed by the CPU 31 or the CPU 61 in accordance with instructions described in programs. Namely, in the following description, processes such as "determining," "extracting," "selecting," "calculating," "specifying," and "controlling" represent processes by the CPU 31 or the CPU 61. Processes by the CPU 61 may include hardware control via the OS 64. Further, in the present disclosure, "data" may be expressed by computer-readable bit string. Furthermore, a plurality of pieces of data that have substantially the same contents but have respective different formats may be treated as the same data. The same applies to "information" in the present disclosure.

FIGS. 4 to 9 (especially, FIGS. 5 and 6) show processes that are particularly important in the present disclosure, whereas other processes to be executed between the particularly important processes are omitted. More specifically, the OS 64 may invoke unshown functions other than the functions shown in FIGS. 5 and 6. Further, in the following description, only typical arguments will be described among arguments that may be specified when each function is invoked, but other arguments may be specified. Further, in the following description, among processes defined by each invoked function, particularly important processes will be described, whereas the other processes may not be described.

First, the edit program 65 of the information processing terminal 50 causes the display 53 to display an edit screen as shown in FIG. 10A. The edit screen includes a read instruction icon 111, a storage instruction icon 112, a print instruction icon 113, and an edited image 114. The edit program 65 accepts a user operation to the edit screen, via the input I/F 54.

The read instruction icon 111 corresponds to an instruction to read contents data stored in the data storage area 62B. The storage instruction icon 112 corresponds to an instruction to store contents data showing the edited image 114 into the data storage area 62B. The print instruction icon 113 corresponds to an instruction to perform a printing operation based on the contents data. The edited image 114 is an image represented by page data included in the contents data. The edit program 65 of the illustrative embodiment displays the edited image 114 on the edit screen in such a manner that a longitudinal direction of the edited image 114 is along a vertical direction of the display 53.

In response to acceptance of a user operation to specify the read instruction icon 111 via the input I/F 54, the edit program 65 causes the display 53 to display a list of readable-format contents data. Next, the edit program 65 reads, out of the data storage area 62B, contents data specified via the input I/F 54. Then, the edit program 65 causes the display 53 to display the edited image 114 represented by the read contents data. In response to acceptance of a user operation to provide an instruction to edit the edited image 114 via the input I/F 54, the edit program 65 edits the contents data. In response to acceptance of a user operation to specify the storage instruction icon 112 via the input I/F 54, the edit program 65 stores the edited contents data into the data storage area 62B.

In response to acceptance of a user operation to specify the print instruction icon 113 via the input I/F 54, the edit program 65 temporarily stores a data ID, which identifies the contents data being edited, into the data storage area 62B. Hereinafter, the temporarily-stored data ID may be referred to as a "specified data ID." The contents data identified by the specified data ID may be referred to as "specified contents data." In the illustrative embodiment, a specified data ID "contents data C" is temporarily stored. Then, the edit program 65 performs a print instruction process. The print instruction process is for instructing the printer 10 to perform a printing operation based on the specified contents data. The print instruction process will be described with reference to FIG. 4.

[Print Instruction Process]

Firstly, the edit program 65 secures a memory area for storing the condition information, in the second area 62D of the data storage area 62B. Further, the edit program 65 invokes the read function defined by the OS 64 with the first pointer "DEVMODE" specified as an argument. The first pointer indicates a head address of the secured memory area. Thereby, the condition information stored in the first area 62C is copied by the OS 64 into the memory area indicated by the first pointer "DEVMODE." Hereinafter, the condition information stored in the memory area secured in the second area 62D may be referred to as "edited condition information."

Subsequently, the edit program 65 causes the display 53 to display a standard setting screen as shown in FIG. 11 (S11). The standard setting screen includes a pulldown menu 121, radio buttons 122, 123, 124, and 125, an "OK" icon 126, and a "CANCEL" icon 127. Then, the edit program 65 accepts a user operation to the standard setting screen, via the input I/F 54 (S12).

The pulldown menu 121 corresponds to an instruction to specify a printer 10 that is caused to perform a printing operation. The radio buttons 122 and 123 correspond to setting values "A4" and "B5" that are settable for the size information. The radio buttons 124 and 125 correspond to setting values "color" and "monochrome" that are settable for the color information. In the standard setting screen as first displayed, the states of the radio buttons 122 to 125 correspond to setting values set for the edited condition information. The "OK" icon 126 corresponds to an instruction to cause the printer 10 to perform the printing operation based on the specified contents data in accordance with execution conditions indicated by the edited condition information. The "CANCEL" icon 127 corresponds to an instruction to terminate the print instruction process.

In response to acceptance of a user operation to the pulldown menu 121 via the input I/F 54, the edit program 65 temporarily stores a printer ID (hereinafter referred to as a "specified printer ID") identifying the specified printer 10 into the data storage area 62B. In the illustrative embodiment, the printer 10A identified by a printer ID "MFP-A" is specified. Further, in response to acceptance of a user operation to the radio buttons 122 to 125 via the input I/F 54 (S12: Setting Change), the edit program 65 updates the edited condition information with a setting value corresponding to a specified one of the radio buttons 122 to 125 (S13).

Then, the edit program 65 causes the display 53 to display the standard setting screen in which the user operations have been reflected (S11). Namely, the edit program 65 is allowed to accept, via the standard setting screen, designation of the printer 10 that is caused to perform the printing operation and changes of the public information included in the edited condition information. Meanwhile, the edit program 65 is unable to accept any change of the private information included in the edited condition information.

In response to accepting designation of the "OK" icon 126 via the input I/F 54 (S12: "OK" Icon), the edit program 65 performs a StartDoc process (S14). Meanwhile, although the following operation is not shown in FIG. 4, the edit program 65 terminates the print instruction process in response to accepting designation of the "CANCEL" icon 127 via the input I/F 54. The StartDoc process is preprocessing for causing the printer 10 to perform the printing operation. The StartDoc process will be described below with reference to FIG. 5.

[StartDoc Process]

Firstly, the edit program 65 invokes a function "StartDoc( )" defined by the OS 64 (S21). Hereinafter, a function invoked in a step Sxx may be referred to as a "function Sxx." For example, the function "StartDoc( )" invoked in S21 may be referred to as a "function S21." The edit program 65 specifies, as arguments of the function S21, the specified data ID "contents data C," the specified printer ID "MFP-A," and the first pointer. In response to the function S21 being invoked, the OS 64 invokes various functions defined by the driver program 66 in a particular order. Further, the driver program 66 performs processes defined by the functions invoked by the OS 64. Detailed explanations of the processes will be omitted.

The OS 64, from which the function S21 has been invoked by the edit program 65, invokes the first function "DrvDocumentEvent( )" (S22). The OS 64 specifies the constant "DOCUMENTEVENT_FIRST" and the second pointer as arguments of the function S22. The second pointer indicates the head address of the first area 62C where the condition information is stored or the head address of the memory area where the condition information read by the OS 64 out of the first area 62C is stored.

Subsequently, in response to the function S22 being invoked, the UI module 66A reads out the condition information stored in the memory area indicated by the second pointer, and stores the read condition information into the second area 62D (S23), and then terminates the function S22 (S24). Namely, in S23, the UI module 66A stores the condition information read out from the first area 62C into the second area 62D.

Hereinafter, the condition information stored into the second area 62D in S23 may be referred to as "retracted condition information." The edited condition information and the retracted condition information may have the same private information but may have different public information. More specifically, when the edited condition information is updated in S13, the public information is different between the edited condition information and the retracted condition information.

Further, the OS 64, from which the function S21 has been invoked, invokes the first function "DrvDocumentEvent( )" (S25). The OS 64 specifies the constant "DOCUMENTEVENT_STARTDOC" as an argument of the function S25. The process in S25 is performed later than the process in S22. Next, the UI module 66A, from which the function S25 has been invoked, performs a preparation instruction process (S26). The preparation instruction process is a process to instruct the printer 10 to perform the pre-printing operation. The preparation instruction process will be described with reference to FIG. 7A.

An instruction to cause the printer 10 to perform a pre-printing operation is preferred to be provided when the print instruction information is certain to be transmitted to the printer 10. After the "OK" icon 126 is designated on the standard setting screen, the print instruction information is transmitted to the printer 10 without a user instruction being received via the input I/F 54. Namely, the designation of the "OK" icon 126 may be regarded as a user's intention to instruct the printer 10 to perform the printing operation. Thus, the UI module 66A is preferred to perform the preparation instruction process after the "OK" icon 126 is designated on the standard setting screen.

More specifically, in response to the "OK" icon 126 being designated on the standard setting screen via the input I/F 54 (S12: "OK" Icon), the edit program 65 invokes the function S21. The OS 64 may invoke a function defined by the UI module 66A even at timing other than a moment at which the function S21 is invoked (e.g., even at timing to refer to information on a printer driver). However, the OS 64 invokes the function S25 only when the function S21 is invoked. Thus, in the illustrative embodiment, the UI module 66A performs the preparation instruction process in response to the function S21 being invoked.

[Preparation Instruction Process]

Figure 7A:
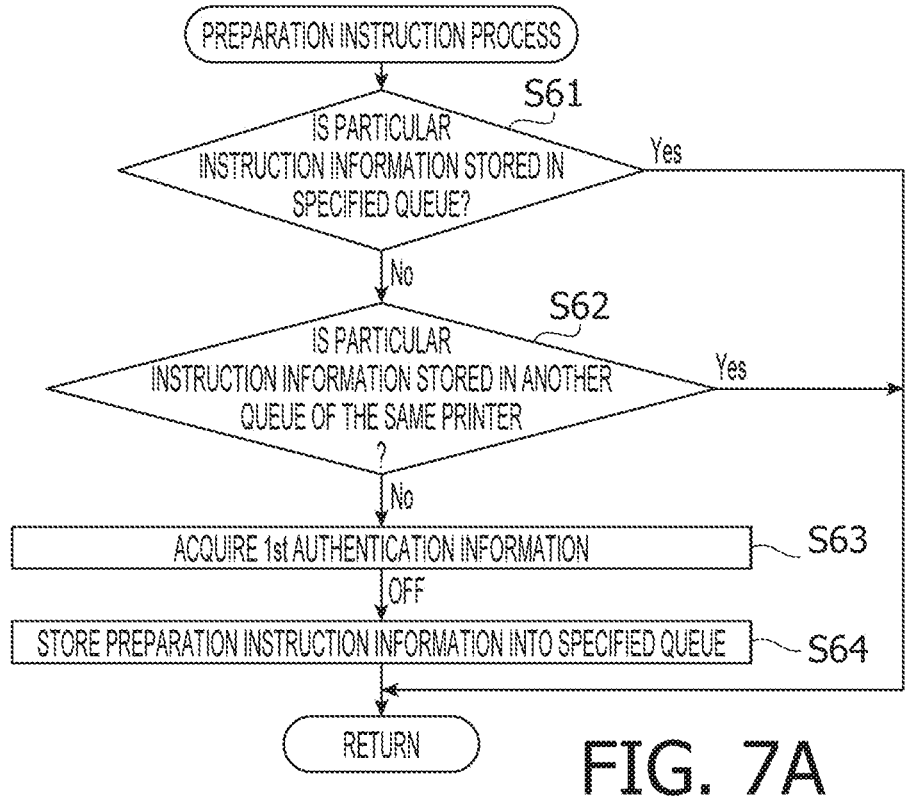
FIG. 7A is a flowchart showing a procedure of a preparation instruction process to be executed by the information processing terminal in the illustrative embodiment according to one or more aspects of the present disclosure.
Figure 7B:
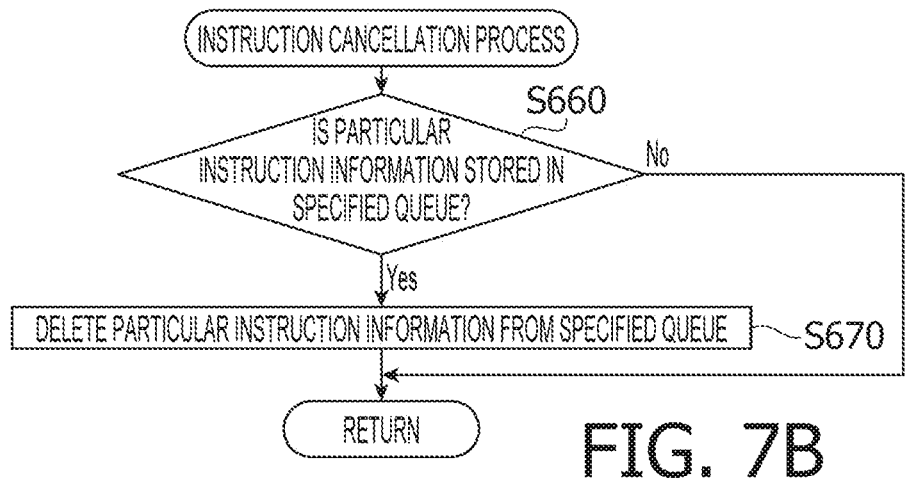
FIG. 7B is a flowchart showing a procedure of an instruction cancellation process to be executed by the information processing terminal in the illustrative embodiment according to one or more aspects of the present disclosure.
Figure 7C:
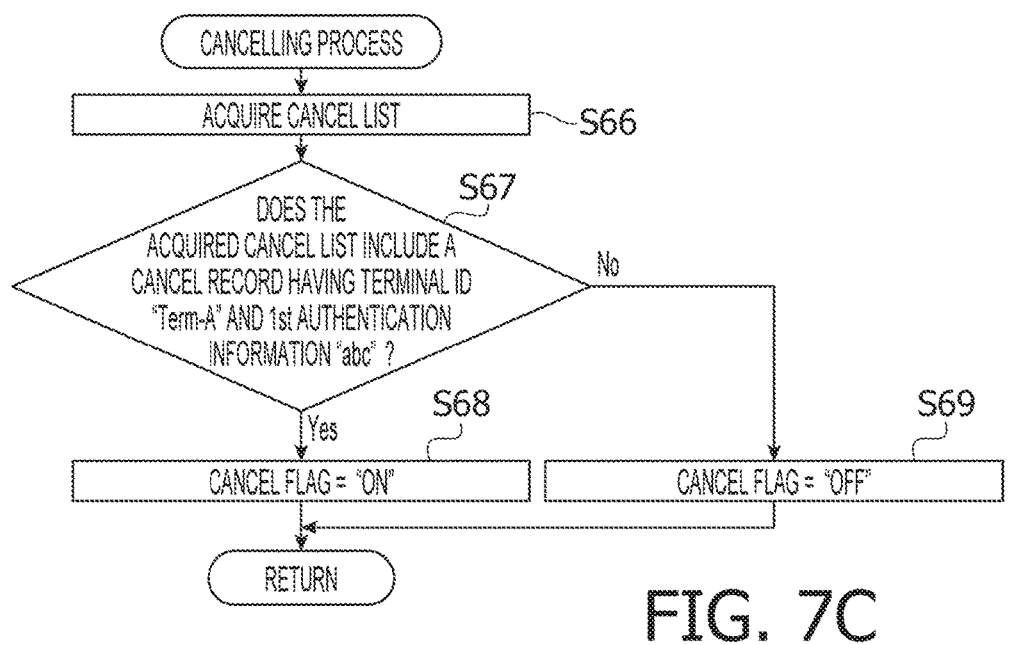
FIG. 7C is a flowchart showing a procedure of a cancelling process to be executed by the information processing terminal in the illustrative embodiment according to one or more aspects of the present disclosure.

As shown in FIG. 7A, firstly, the UI module 66A determines whether particular instruction information is stored in the queue area 67A that is a specified queue for the printer 10A (S61). The specified queue is designated as an argument of a function invoked by the OS 64. Further, the UI module 66A determines whether particular instruction information is stored in the queue area 67B that is another queue area into which information to be sent to the printer 10A is stored (S62). It is noted that the UI module 66A also makes the determinations in S61 and S62 with respect to information written into the queue areas 67A and 67B by programs other than the driver program 66.

The particular instruction information represents an instruction to operate the operating unit 20 of the printer 10. In the illustrative embodiment, the particular instruction information includes the preparation instruction information or the print instruction information, but does not include the status transmission instruction information. Namely, the particular instruction information is written into the queue areas 67A to 67C when below-mentioned processes in S45, S48, S53, and S64 are executed by the driver program 66 or other programs.

Subsequently, in response to determining that particular instruction information is not stored in any of the queue areas 67A and 67B (S61: No, and S62: No), the UI module 66A reads out the first authentication information "abc" from the retracted condition information stored in the second area 62D (S63). The UI module 66A transmits the preparation instruction information to the printer 10A via the communication I/F 55 (S64). The preparation instruction information transmitted in S64 includes the terminal ID "Term-A" of the information processing terminal 50 and the first authentication information "abc" read out in S63. It is noted that the terminal ID "Term-A" and the first authentication information "abc" are also incorporated into various kinds of instruction information written into the queue area 67A in below-mentioned steps S45, S48, S53, and S17.

More specifically, in S64, the UI nodule 66A generates a job ID "_preparation_." The UI module 66A generates the job ID so as to prevent the job ID from being identical to character strings that may become the specified data ID. This is because the specified data ID is used as a job ID in a below-mentioned step S29. Then, as shown in FIG. 3C, the UI module 66A stores, into the queue area 67A, the preparation instruction information to which the generated job ID "_preparation_" is added (S64). The preparation instruction information stored in the queue 67A is transmitted by the OS 64 to the printer 10A.

Meanwhile, in response to determining that particular instruction information is stored in the queue area 67A (S61: Yes), or determining that particular instruction information is stored in the queue area 67B (S61: No, and S62: Yes), the UI module 66A terminates the preparation instruction process without executing S63 or S64. Namely, in the steps S61 and S62, the UI module 66A determines whether to provide the preparation instruction information to cause the printer 10A to start the pre-printing operations. In other words, the UI module 66A determines whether to transmit the preparation instruction information in advance of the below-mentioned print instruction information.

Referring back to FIG. 5, the UI module 66A terminates the function S25 (S27). Next, in response to the function S25 being terminated (S27), the OS 64 invokes a second function "DryStartDoc( )" defined by the rendering module 66B (S28). The OS 64 specifies the specified data ID "contents data C" specified as an argument of the function S21 and the first pointer, as arguments of the function S28.

Subsequently, in response to the function S28 being invoked, the rendering module 66B generates a print job with the specified data ID "contents data C," which has been specified as an argument of the function S28, as a job ID in the queue area 67A that is the specified queue (S29). Then, the rendering module 66B terminates the function S28 (S30). To various kinds of instruction information written into the queue 67A in below-mentioned steps S45, S48, S53, and S17, the job ID "contents data C" is added. In this regard, however, the print job identified by the job ID "contents data C" does not include any instruction information at this point of time.

Subsequently, in response to the function S28 being terminated (S30), the OS 64 invokes the first function "DrvDocumentEvent( )" (S31). The OS 64 specifies the constant "DOCUMENTEVENT_STARTDOCPOST" as an argument of the function 531. Next, in response to the function S31 being invoked, the UI module 66A performs an instruction cancellation process (S32). The instruction cancellation process will be described below with reference to FIG. 7B.

The UI module 66A determines whether the preparation instruction information temporarily stored in S64 with the job ID "_preparation_" added thereto is stored in the queue area 67A (S660). Exemplary cases where a positive determination is made in S66 (S66: Yes) may include, but are not limited to, a case where the communication I/F 55 is not connected with the communication network 100 and a case where the printer 10A is powered off In response to determining that the preparation instruction information is stored in the queue area 67A (S660: Yes), the UI module 66A deletes the preparation instruction information from the queue area 67A (S670). Meanwhile, in response to determining that the preparation instruction information is not stored in the queue area 67A (S660: No), the UI module 66A terminates the instruction cancellation process without executing 5670.

Referring back to FIG. 5, the UI module 66A terminates the function S31 (S33). Further, in response to the function S31 being terminated (S33), the OS 64 terminates the function S21 (S34). Thereby, the StartDoc process is terminated. Subsequent to the function S21, referring back to FIG. 4, the edit program 65 performs a StartPage process (S15).

The StartPage process is a process of generating the print instruction information. The StartPage process is performed for each piece of page data contained in the specified contents data. For instance, each piece of page data as a processing target of the StartPage process is specified as an argument of a function, by the edit program 65. Referring to FIG. 6, the StartPage process will be described below.

[StartPage Process]

The edit program 65 invokes a function "StartPage" defined by the OS 64 (S41). Subsequently, the OS 64 invokes the first function "DryDocumentEvent( )" (S42). The OS 64 specifies a constant "DOCUMENTEVENT_STARTPAGE" as an argument of the function S42. Next, in response to the function S42 being executed, the UI module 66A performs a cancelling process. The cancelling process is a process of, when an operation that the information processing terminal 50 has instructed the printer 10 to perform is cancelled, cancelling subsequent processes in the information processing terminal 55. The cancelling process will be described with reference to FIG. 7C.

First, the UI module 66A acquires a cancel list from the printer 10 via the communication I/F 55 (S66). Next, the UI module 66A determines whether the cancel list acquired in S66 includes a cancel record having the terminal ID "Term-A" and the first authentication information "abc" that are included in the preparation instruction information transmitted in S64 (S67). When determining that the acquired cancel list includes the cancel record (S67: Yes), the UI module 66A sets a first value "ON" for a cancel flag stored in the data storage area 62B (S68). Meanwhile, when determining that the acquired cancel list does not include the cancel record (S67: No), the UI module 66A sets a second value "OFF" for a cancel flag stored in the data storage area 62B (S69).

The first value "ON" set for the cancel flag represents that an operation that the printer 10 has been instructed to perform is cancelled. Meanwhile, the second value "OFF" set for the cancel flag represents that the operation that the printer 10 has been instructed to perform is not cancelled. It is noted that the cancelling process shown in FIG. 7C may be performed by the rendering module 66B at the start of a below-mentioned function S44.

Although the following features are not shown in any drawings, the driver program 66 determines which value is set for the cancel flag, at the start of a function invoked by the edit program 65 or the OS 64 in the StartPage process. Then, in response to determining that the second value "OFF" is set for the cancel flag, the driver program 66 performs a process defined by the function. Meanwhile, in response to determining that the first value "ON" is set for the cancel flag, the driver program 66 terminates the function without performing the process defined by the function.

Subsequently, in response to the function S42 being terminated, the OS 64 invokes a function "DryStartPage( )" defined by the rendering module 66B (S44). Next, in response to the function S44 being invoked, the rendering module 66B generates header instruction information and stores the generated header instruction information into the queue area 67A (S45). The header instruction information is print instruction information for indicating operations to be executed before printing an image on a single sheet, of a series of operations for printing the image on the single sheet. In the illustrative embodiment, the header instruction information includes the authentication instruction information, the feeding instruction information, and the cueing instruction information.

The authentication instruction information is information for providing an instruction to determine whether the information processing terminal 50, which is a sending source of the print instruction information, is authorized to provide an instruction to cause the printer 10 to perform the printing operation. The authentication instruction information includes the same terminal ID "Term-A" and the same first authentication information "abc" as the terminal ID and the first authentication information included in the preparation instruction information. More specifically, the edit program 65 reads out the first authentication information from the edited condition information and incorporate the read first authentication information into the authentication instruction information. The feeding instruction information is for instructing the sheet conveyor 21 to feed a sheet from a feed tray identified by the tray information of the edited condition information. The cueing instruction information is for instructing the sheet conveyor 21 to convey the fed sheet to a position where a first printing area of the sheet is opposed to the ink discharger 22.

Then, the rendering module 66B terminates the function S44 (S46). Subsequently, in response to the function S44 being terminated (S46), the OS 64 terminates the function S41 (S47). Next, in response to the function S41 being terminated, the edit program 65 invokes a drawing function defined by the OS 64. Further, in response to the drawing function being invoked by the edit program 65, the OS 64 invokes a drawing function defined by the rendering module 66B.

Then, the plurality of drawing functions are performed in a particular order, and thereby the rendering module 66B generates print data from the page data. For example, the print data may include, but is not limited to, raster data generated by rasterizing page data. Further, the rendering module 66B generates print instruction information that provides an instruction to perform a printing operation based on the print data, and stores the generated print instruction information into the queue area 67A (S48). As will be described later, in S48, the ink discharge instruction information and the feeding instruction information are generated.

The ink discharge instruction information indicates ink discharge timing for the ink discharger 22 to discharge ink droplets to print an image on the printing area of the sheet opposed to the ink discharger 22. The conveyance instruction information is for instructing the sheet conveyor 21 to convey the sheet to a position where a next printing area for an image to be subsequently printed is opposed to the ink discharger 22. Hereinafter, a detailed explanation will be provided of a process of the rendering module 66B generating the ink discharge instruction information and the conveyance instruction information.

Firstly, at particular timing since S28, the rendering module 66B informs the OS 64 of unit information. The unit information represents a unit of data delivered as an object to be rasterized. For instance, "page" or "band" may be set for the unit information. The "page" provides an instruction to deliver the data to be rasterized on the basis of a unit of page data. The "band" provides an instruction to deliver the data to be rasterized on the basis of a unit of band data. A piece of band data is a part of a piece of page data. More specifically, a piece of page data is sectioned into a plurality of pieces of band data adjoining in a longitudinal direction of the corresponding page. Further, an image represented by a piece of band data has a larger area than an area of an image represented by a piece of below-mentioned pass data.

For instance, in response to a specific size (e.g., A4) being set for the size information of the edited condition information, the rendering module 66B informs the OS 64 of the unit information "page." A sheet of the specific size is conveyed by the sheet conveyor 21 of the printer 10, in a state where a short direction of the sheet is coincident with the conveyance direction. Further, on the sheet of the specific size, an image is printed by the ink discharger 22 of the printer 10 that is moving along a longitudinal direction of the sheet.

Meanwhile, for instance, in response to a non-specific size (e.g., a size other than A4) being set for the size information of the edited condition information, the rendering module 66B informs of the unit information "band." A sheet of the non-specific size is conveyed by the sheet conveyor 21 of the printer 10, in a state where a longitudinal direction of the sheet is coincident with the conveyance direction. Further, on the sheet of the non-specific size, an image is printed by the ink discharger 22 of the printer 10 that is moving along a short direction of the sheet.

It is noted that the unit information may be informed of, e.g., as a return value of a function invoked by the OS 64. Further, for instance, the specific size may be different between the printers 10A and 10B. The specific size for each of the printers 10A and 10B may be written in a source cord of the driver program 66. Alternatively, the driver program 66 may inquire of the printers 10A and 10B about the specific size(s) for the printers 10A and 10B.

The OS 64, which has acquired the unit information "page," delivers page data to the rendering module 66B in S48. The rendering module 66B rasterizes the whole of the page data received from the OS 64 and generates raster data. Subsequently, the rendering module 66B rotates the raster data developed into the data storage area 62B, by 90 degrees in the data storage area 62B. Next, the rendering module 66B extracts a plurality of pieces of pass data each representing an image to be printed in one printing area, from the raster data rotated by 90 degrees. Then, the rendering module 66B generates ink discharge instruction information and conveyance instruction information based on each piece of the extracted pass data, and writes, in series into the queue area 67A, the generated ink discharge instruction information and the generated conveyance instruction information. The rendering module 66B sequentially performs, for every piece of the pass data included in the page data, extracting the pass data, generating the ink discharge instruction information and the conveyance instruction information, and writing the generated information into the queue area 67A.

Meanwhile, the OS 64, which has acquired the unit information "band," delivers one piece of the plurality of pieces of band data included in the page data to the rendering module 66B. The rendering module 66B rasterizes the whole of the band data received from the OS 64 and generates raster data. Subsequently, the rendering module 66B generates ink discharge instruction information and conveyance instruction information based on the raster data, and writes into the queue area 67A the generated ink discharge instruction information and the generated conveyance instruction information. Then, for every piece of the band data included in the page data, the aforementioned process is repeatedly performed.

Namely, in the case of the unit information "page," after the whole of the page data has been converted into the raster data, and the raster data has been rotated by 90 degrees in the data storage area 62B, the first piece of the ink discharge instruction information is written into the queue area 67A. Meanwhile, in the case of the unit information "band," after the whole of the band data that is a part of the page data has been converted into the raster data, the first piece of the ink discharge instruction information is written into the queue area 67A. That is, a period of time from when the "OK" icon 126 is specified to when the first ink discharge instruction information is written into the queue area 67A in the case of the unit information "page" is longer than that in the case of the unit information "band."

Subsequently, in response to the process in S48 for the specified page data being completed, the edit program 65 invokes a function "EndPage( )" defined by the OS 64 (S49). Next, the OS 64 invokes the first function "DrvDocumentEvent( )" (S50). The OS 64 specifies a constant "DOCUMENTEVENT_ENDPAGE" as an argument of the function S50. Next, the UI module 66A performs a particular process and terminates the function S50 (S51).

Subsequently, in response to the function S50 being terminated (S51), the OS 64 invokes a function "DrvEndPage( )" defined by the rendering module 66B (S52). Next, in response to the function S52 being invoked, the rendering module 66B generates sheet discharge instruction information, and stores the generated sheet discharge instruction information into the queue area 67A (S53). The sheet discharge instruction information is for instructing the sheet conveyor 21 to discharge the sheet with images printed thereon out of the printer 10.

A plurality of pieces of print instruction information written into the queue area 67A in the StartPage process shown in FIG. 6 are transmitted by the OS 64 to the printer 10A in the written sequence. Typically, the OS 64 transmits the authentication instruction information, the feeding instruction information, the cueing instruction information, the ink discharge instruction information, the conveyance instruction information, the ink discharge instruction information, . . . , and the sheet discharge instruction information to the printer 10A in the above sequence via the communication I/F 55.

Then, the rendering module 66 terminates the function S52 (S54). Subsequently, in response to the function S52 being terminated (S54), the OS 64 terminates the function S49 (S55). Thereby, the StartPage process is terminated. Next, referring back to FIG. 4, the edit program 65 determines whether the StartPage process has been performed for every piece of the page data included in the specified contents data (S16). In response to determining that there is an unprocessed piece of page data for which the StartPage process has not been performed (S16: Yes), the edit program 65 performs the StartPage process for the unprocessed piece of page data (S15).

Namely, the driver program 66 performs the StartPage process N times in the print instruction process for the specified contents data including N pieces of page data. It is noted that the number "N" is an integer equal to or more than two. Further, the driver program 66 performs the cancelling process in the function S42 executed in each of the StartPage processes performed N times. Then, in response to the first value "ON" being set for the cancel flag in the StartPage process for page data of an M-th page, the driver program 66 does not generate print data of the M-th page to the N-th page or print instruction information based on the print data of those pages. Meanwhile, in response to the second value "OFF" being set for the cancel flag in the StartPage process for page data of the first page to an (M−1)-th page, the driver program 66 generates print data of those pages and print instruction information based on the print data of the pages, and transmits the generated print instruction information to the printer 10. It is noted that the number "M" is less than N (i.e., M<N).

Meanwhile, in response to determining that the StartPage process has been performed for every piece of the page data included in the specified contents data (S16: No), the edit program 65 performs an EndDoc process (S17). The End-Doc process is post-processing to be executed after causing the printer 10 to perform a printing operation. Although the following features are not shown in any drawings, the driver program 66 generates completion instruction information and stores the generated completion instruction information into the queue area 67A in the EndDoc process. The completion instruction information is for informing the printer 10 that a series of processes for the print job generated in S29 have been completed. The completion instruction information includes the terminal ID "Term-A" and the first authentication information "abc" that are included in the preparation instruction information transmitted in S64.

[Print Process]

Figure 8:
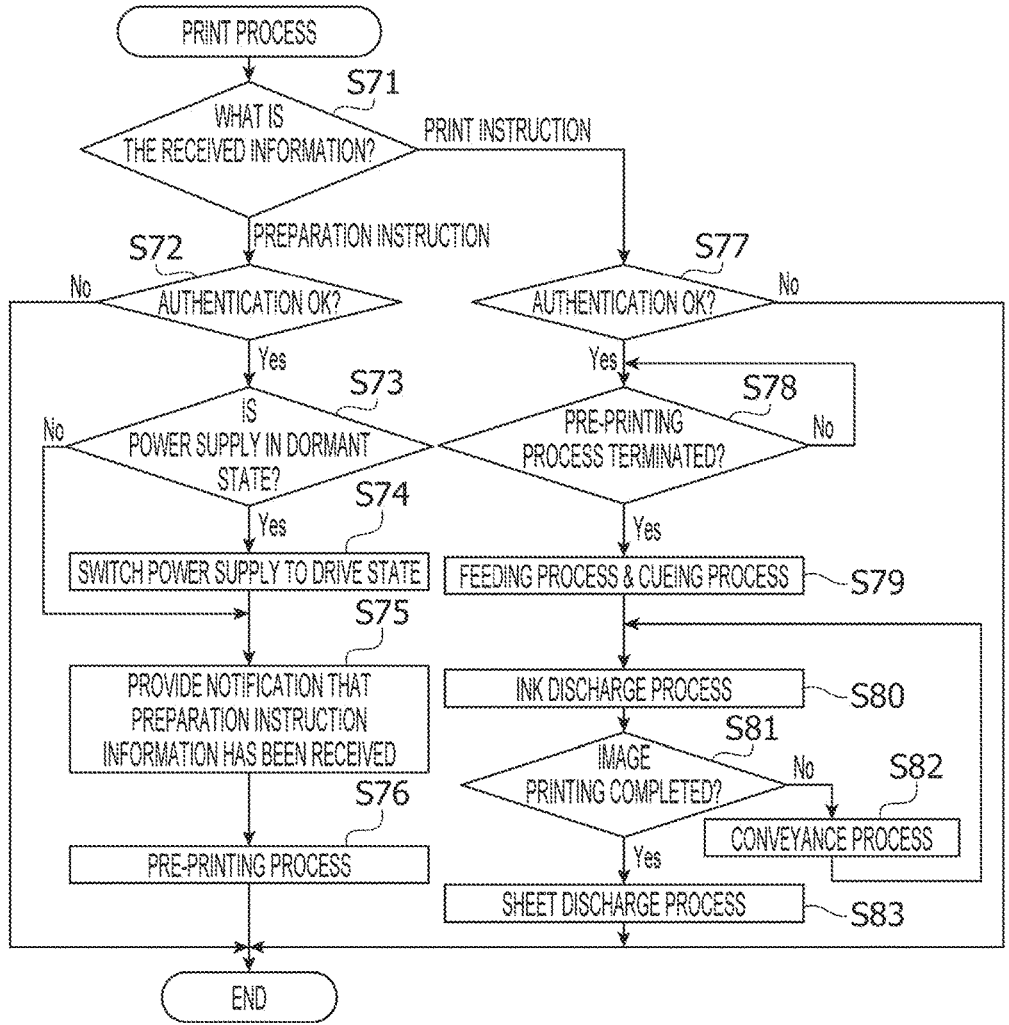
FIG. 8 is a flowchart showing a procedure of a print process to be executed by the printer in the illustrative embodiment according to one or more aspects of the present disclosure.
Figure 9:
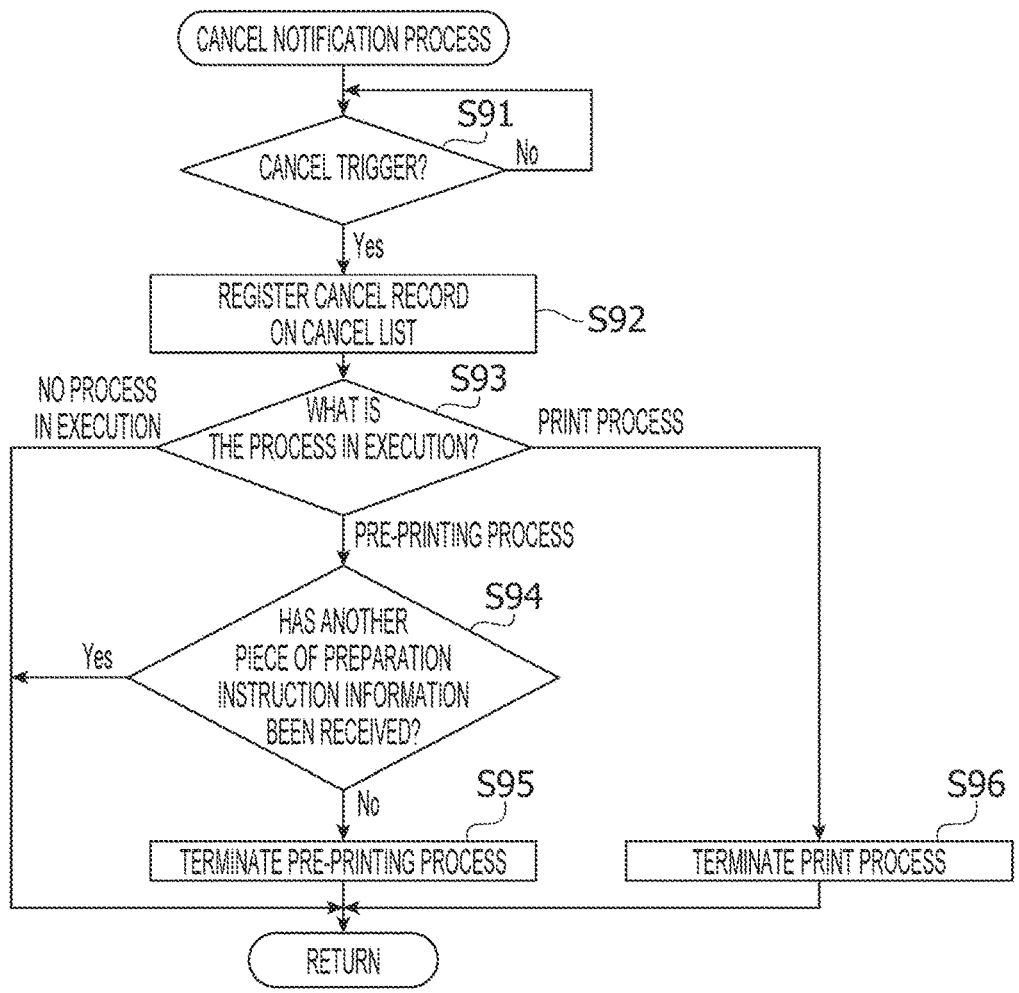
FIG. 9 is a flowchart showing a procedure of a cancel notification process to be executed by the printer in the illustrative embodiment according to one or more aspects of the present disclosure.

Subsequently, referring to FIG. 8, a print process to be performed by the printer 10 will be described. The printer 10 performs the print process in response to receiving the preparation instruction information or the print instruction information from the information processing terminal 50 via the communication I/F 25. Each of the following processes may be performed by the CPU 31 executing one or more programs 32A stored in the ROM 32 or may be performed by one or more hardware circuits included in the controller 30.

The controller 30 of the printer 10 receives various kinds of instruction information from the information processing terminal 50 or a device (not shown) connected with the communication network 100, via the communication I/F 25, and performs various processes in accordance with the received instruction information. In addition, in response to further receiving instruction information during the execution of a pre-printing process or the print process, the controller 30 temporarily stores the newly received instruction information into the EEPROM 34. Then, in response to the process in execution being completed, the controller 30 reads out the instruction information temporarily stored in the EEPROM 34 in a sequence in which each of the temporarily stored instruction information has been received, and performs a process according to the read instruction information.

The controller 30 receives the preparation instruction information from the information processing terminal 50 via the communication I/F 25 (S71: Preparation Instruction). In response to receiving the preparation instruction information (S71: Preparation Instruction), the controller 30 temporarily stores into the RAM 33 the terminal ID "Term-A" and the first authentication information "abc" included in the preparation instruction information. Further, the controller 30 determines whether the information processing terminal 50, which is a sending source of the preparation instruction information, is authorized to provide an instruction to cause the printer 10 to perform the printing operation (S72).

First, in S72, the controller 30 determines whether an authentication information record, including second authentication information identical to the first authentication information "abc" included in the received preparation instruction information, is registered on an authentication information list. Subsequently, in response to determining that the authentication information record including the second authentication information "abc" is registered on the authentication information list, the controller 30 compares a cumulative number of sheets of the authentication information record with a threshold value. In response to determining that the cumulative number of sheets of the authentication information record is less than the threshold value, the controller 30 determines that the information processing terminal 50 is authorized to provide an instruction to cause the printer 10 to perform the printing operation (S72: Yes). Meanwhile, in response to determining that the authentication information record including the second authentication information "abc" is not registered on the authentication information list or that the cumulative number of sheets of the authentication information record is equal to or more than the threshold value, the controller 30 determines that the information processing terminal 50 is not authorized to provide an instruction to cause the printer 10 to perform the printing operation (S72: No).

In response to determining that the information processing terminal 50 is not authorized to provide an instruction to cause the printer 10 to perform the printing operation (S72: No), the controller 30 performs a cancel notification process without executing any of the steps S73 to S76. The cancel notification process is a process of providing the information processing terminal 50 with a notification that the pre-printing operation and the printing operation have been cancelled at the side of the printer 10. The cancel notification process will be described with reference to FIG. 9.

First, in response to determining that the first authentication information is not identical to the second authentication information, the controller 30 detects the determination as a cancel trigger, (S91: Yes). Next, the controller 30 registers, on the cancel list, the cancel record having the terminal ID "Term-A" and the first authentication information "abc" that are temporarily stored in the RAM 33 (S92). Subsequently, the controller 30 determines whether the pre-printing process or the print process is in execution (S93). When the controller 30 determines that the authentication information record, including the second authentication information identical to the first authentication information "abc," is not registered on the authentication information list (S72: No), the pre-printing process or the print process is not in execution (S93: No Process in Execution). In this case, the controller 30 terminates the cancel notification process without executing any of the steps S94 to S96. The steps S94 to S96 will be described later.

Meanwhile, in response to determining that the information processing terminal 50 is authorized to provide an instruction to cause the printer 10 to perform the printing operation (S72: Yes), the controller 30 determines whether the power supply 11 is in a dormant state (S73). For example, the controller 30 may store flag information indicating a current state of the power supply 11 in the RAM 33 or the EEPROM 34, and may make the determination in S73 based on the flag information. Nonetheless, the method for making the determination in S73 is not limited to the above example. The controller 30 may make the determination in S73 in other methods.

Subsequently, in response to determining that the power supply 11 is in the dormant state (S73: Yes), the controller 30 switches the state of the power supply 11 from the dormant state to a drive state (S74). More specifically, the controller 30 outputs a power supply signal of a HIGH level to the power supply 11. Meanwhile, in response to determining that the power supply 11 is in the drive state (S73: No), the controller 30 skips S74.

Subsequently, the controller 30 provides a notification that the preparation instruction information has been received, via the display 23 (S75). For example, the controller 30 may provide the notification by lighting a backlight of the display 23 only for a particular period of time. Nonetheless, the method for providing the notification is not limited to the above example. The controller 30 may provide the notification in other methods, e.g., by lighting an LED lamp (not shown) or by outputting a sound from a speaker (not shown).

Subsequently, the controller 30 controls the operating unit 20 to perform a pre-printing process (S76). The pre-printing process is a process to be performed by the printer 10 in advance of the printing operation so as to print an image with particular quality on a sheet in the printing operation. The pre-printing process includes a plurality of pre-printing operations. For instance, the pre-printing process may include some or all of an uncapping process, a flushing process, and a voltage boosting process. The uncapping process is a process of separating a cap for covering the nozzle surface away from the ink discharger 22. The flushing process is a process of causing the ink discharger 22 to discharge ink droplets outside an area through which sheets pass. The voltage boosting process is a process of boosting a supply voltage of the power supply 11 to a target voltage.

The controller 30 stores flag information corresponding to each of the plurality of pre-printing operations in the RAM 33 or the EEPROM 34. At a point of time to start the pre-printing operation, a second value "OFF" representing that the corresponding pre-printing operation has not been completed is set for every piece of the flag information. Then, in response to one of the pre-printing operations being completed, the controller 30 sets, for the corresponding piece of the flag information, a first value "ON" representing that the pre-printing operation has been completed.

Subsequently, the controller 30 receives the print instruction information from the information processing terminal 50 via the communication I/F 25 (S71: Print Instruction). Namely, the controller 30 receives the authentication instruction information, the feeding instruction information, the cueing instruction information, the ink discharge instruction information, the conveyance instruction information, the ink discharge instruction information, . . . , and the sheet discharge instruction information in this sequence from the information processing terminal 50 via the communication I/F 25.

Each time the controller 30 receives instruction information from the information processing terminal 50 via the communication I/F 25, the controller 30 determines whether a cancel record, having the terminal ID "Term-A" and the first authentication information "abc" included in the instruction information, is registered on the cancel list. In response to determining that the aforementioned cancel record is not registered on the cancel list, the controller 30 performs processes according to the instruction information (S77-S83). Meanwhile, in response to determining that the aforementioned cancel record is registered on the cancel list, the controller 30 does not perform any of the processes according to the instruction information.

In response to receiving the authentication instruction information (S71: Print Instruction), the controller 30 determines whether the information processing terminal 50, which is a sending source of the authentication instruction information, is authorized to provide an instruction to cause the printer 10 to perform the printing operation (S77). The process in S77 may be the same as the process in S72. In response to determining that the information processing terminal 50 is not authorized to provide an instruction to cause the printer 10 to perform the printing operation (S77: No), the controller 30 skips the steps S78 to S83.

Meanwhile, in response to determining that the information processing terminal 50 is authorized to provide an instruction to cause the printer 10 to perform the printing operation (S77: Yes), the controller 30 determines whether the pre-printing process has been terminated (S78). More specifically, in response to the first value "ON" being set for every piece of the flag information associated with the pre-printing process, the controller 30 determines that the pre-printing process has been terminated (S78: Yes). Meanwhile, in response to the second value "OFF" being set for at least one piece of the flag information associated with the pre-printing process, the controller 30 determines that the pre-printing process has not been terminated (S78: No).

A receipt time interval between the preparation instruction information and the print instruction information varies, e.g., depending on a throughput in S48 or a condition of the communication network 100. Namely, the pre-printing process started in response to receipt of the preparation instruction information as a trigger may not have been terminated at a point of time when the print instruction information is received. Thus, in response to determining that the pre-printing process has not been terminated (S78: No), the controller 30 waits in a standby state until the pre-printing process is terminated, without executing the subsequent process. Then, in response to determining that the pre-printing process has been terminated (S78: Yes), the controller 30 controls the operating unit 20 to perform a printing operation according to the received print instruction information (S79-S83).

In the printing operation, firstly, the controller 30 performs a feeding process according to the received feeding instruction information and a cueing process according to the received cueing instruction information (S79). Namely, the controller 30 controls the sheet conveyor 21 to feed a sheet placed on a feed tray identified by the feeding instruction information. Next, the controller 30 controls the sheet conveyor 21 to convey the sheet fed in the feeding process to a position indicated by the cueing instruction information. It is noted that the feeding process and the cueing process may be performed in the pre-printing process.

Subsequently, the controller 30 performs an ink discharge process in accordance with the received ink discharge instruction information (S80). Namely, the controller 30 moves the ink discharger 22 from one side to the other side in the main scanning direction, and controls the ink discharger 22 to discharge ink droplets at ink discharge timing indicated by the ink discharge instruction information. Next, the controller 30 determines whether an image has been printed in every printing area of the sheet (S81). In other words, the controller 30 determines which one of the conveyance instruction information and the sheet discharge instruction information has been received next to the ink discharge instruction information used in the last step S80.

Subsequently, in response to determining that an image has not been printed in every printing area of the sheet (S81: No), the controller 30 performs a conveyance process according to the received conveyance instruction information (S82). Namely, the controller 30 controls the sheet conveyor 21 to convey the sheet only over a conveyance distance indicated by the conveyance instruction information. The controller 30 repeatedly performs the steps S80 to S82 until an image has been printed in every printing area of the sheet (S81: No).

Then, in response to determining that an image has been printed in every printing area of the sheet (S81: Yes), the controller 30 performs a sheet discharge process according to the received sheet discharge instruction information (S83). Namely, the controller 30 controls the sheet conveyor 21 to discharge the sheet with the images printed thereon out of the printer 10. It is noted that, when the specified contents data includes a plurality of pieces of page data, the controller 30 repeatedly performs the steps S79 to S83. Thereby, the images represented by the print data generated in S48 (i.e., the images represented by the specified contents data) are printed on the sheets.

Further, although the following features are not shown in any drawings, after receiving the sheet discharge instruction information, the controller 30 receives the completion instruction information from the information processing terminal 50 via the communication I/F 25. Subsequently, the controller 30 determines whether a cancel record, having the terminal ID and the first authentication information included in the received completion instruction information, is registered on the cancel list. Then, in response to determining that the aforementioned cancel record is registered on the cancel list, the controller 30 deletes the cancel record from the cancel list.

Further, during the period of time from when the controller 30 has received the preparation instruction information to when the controller 30 performs the sheet discharge process, the controller 30 is allowed to accept a cancelling operation via the input I/F 24. The cancelling operation is a user operation to instruct the controller 30 to cancel the execution of the pre-printing process and the print process. For example, the cancelling operation may include, but is not limited to, an operation of tapping a "CANCEL" icon displayed on the display 23. In response to accepting the cancelling operation via the I/F 24 as a cancel trigger, the controller 30 executes S92 and the following steps.

Further, in response to accepting the cancelling operation during the execution of the pre-printing process (S93: Pre-printing Process), the controller 30 determines whether the controller 30 has received a further piece of preparation instruction information during the execution of the pre-printing process (S94). In other words, the controller 30 determines whether a further piece of preparation instruction information is temporarily stored in the EEPROM 34. In response to determining that a further piece of preparation instruction information is temporarily stored in the EEPROM 34 (S94: Yes), the controller 30 continues to perform the pre-printing process that is in execution. Meanwhile, in response to determining that the preparation instruction information is not temporarily stored in the EEPROM 34 (S94: No), the controller 30 stops the pre-printing process in execution (S95).

Further, in response to accepting the cancelling operation during the execution of the print process (S93: Print Process), the controller 30 stops the print process in execution (S96). More specifically, the controller 30 deletes instruction information including the terminal ID and the first authentication information that are included in the cancel record registered in S92, from various kinds of instruction information temporarily stored in the EEPROM 34. In addition, the controller 30 discharges a sheet on which an image is being printed out of the printer 10.

Further, in response to detecting the cancel trigger (S91: Yes), the controller 30 may display an inquiry screen on the display 23. For example, as shown in FIG. 12, the inquiry screen may display thereon the terminal ID of the information processing terminal 50 that has indicated the process to be cancelled, a message "May the job be cancelled?," a "YES" icon 131, and a "NO" icon 132. The controller 30 may accept a user operation to the inquiry screen via the input I/F 24.

Subsequently, in response to accepting designation of the "YES" icon 131 via the input I/F 24, the controller 30 may execute S92 and the following steps. Meanwhile, in response to accepting designation of the "NO" icon 132 via the input I/F 24, the controller 30 may terminate the cancel notification process without executing S92 or the following steps. Thereby, it is possible to prevent the user from mistakenly cancelling a process different from a process that the user wishes to cancel.

[Operations and Advantageous Effects of Illustrative Embodiment]

According to the illustrative embodiment, the printer 10, which has detected a cancel trigger, issues a cancel notification to the information processing terminal 50. Then, the driver program 66, which has acquired the cancel notification, cancels a generation process of generating the print data and the print instruction process. Thereby, it is possible to prevent transmission of unnecessary print data from the information processing terminal 50 to the printer 10.

Nonetheless, since there exists a time lag between when the cancel record is registered on the cancel list and when the first value "ON" is set for the cancel flag, the controller 30 might receive instruction information regarding an already-cancelled process. Therefore, each time the controller 30 receives one of various kinds of instruction information from the information processing terminal 50, the controller 30 determines whether a process associated with the received instruction information has already been cancelled, based on the cancel list. Then, in response to determining that the process associated with the received instruction information has already been cancelled, the controller 30 does not perform the process according to the instruction information. Thus, it is possible to prevent execution of an unnecessary pre-printing process and an unnecessary print process.

Meanwhile, when a further piece of preparation instruction information is received during the execution of the pre-printing process, even though the pre-printing process is cancelled in response to detection of the cancel trigger, another pre-printing process is performed in accordance with the further preparation instruction information. Hence, as described above, when the cancel trigger is detected during the execution of the pre-printing process, and the further preparation instruction information is temporarily stored in the EEPROM 34, it is preferred to issue a cancel notification and complete the pre-printing process.

With respect to associations of elements exemplified in the illustrative embodiment with elements to be defined according to aspects of the present disclosure, the terminal ID that identifies the information processing terminal 50 may be an example of device identification information according to aspects of the present disclosure. The terminal ID and the first authentication information included in each cancel record may be examples of job identification information that identifies a corresponding pre-printing operation and a corresponding printing operation. The cancel record registered on the cancel list is an example of a cancel notification issued by a printer to a processor identified by the device identification information in accordance with aspects of the present disclosure. The process in S64 may be an example of a preparation instruction process according to aspects of the present disclosure. The StartPage process in S15 (see FIG. 6) may be an example of a generating process according to aspects of the present disclosure. The cancelling process shown in FIG. 7C may be an example of a cancelling process according to aspects of the present disclosure. The processes in S45, S48, and S53 may be examples of print instruction process according to aspects of the present disclosure. The process of receiving the preparation instruction information in S71 may be an example of a first receiving process according to aspects of the present disclosure. The process in S72 may be an example of an authentication determining process according to aspects of the present disclosure. The process in S92 may be an example of an issuance process according to aspects of the present disclosure. The process in S76 may be an example of a pre-printing process according to aspects of the present disclosure. The process of receiving the print instruction information in S71 may be an example of a second receiving process according to aspects of the present disclosure. The process of determining whether the cancel record, including the terminal ID and the first authentication information included in each piece of instruction information received from the information processing terminal 50, is registered on the cancel list may be an example of a job cancellation determining process according to aspects of the present disclosure. The process including S79 to S83 may be an example of a print process according to aspects of the present disclosure. The process in S94 may be an example of a determining process according to aspects of the present disclosure. The process in S95 may be an example of a pre-printing cancelling process according to aspects of the present disclosure. The process in S96 may be an example of a print cancelling process according to aspects of the present disclosure. The designation of the "YES" icon 131 on the inquiry screen shown in FIG. 12 may be an example of a selecting operation to select issuing the cancel notification in accordance with aspects of the present disclosure. The designation of the "NO" icon 132 on the inquiry screen shown in FIG. 12 may be an example of a selecting operation to select not issuing the cancel notification in accordance with aspects of the present disclosure.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

In the aforementioned illustrative embodiment, the inconsistency between the first authentication information and the second authentication information and the cancelling operation have been described as examples of the cancel trigger. However, the cancel trigger is not limited to those examples. For instance, an error caused during the pre-printing process or the print process may be detected as a cancel trigger. Examples of the error caused during the pre-printing process or the print process may include, but are not limited to, shortage of ink, toner, or sheets to be used for printing, sheet jam on the conveyance path of the printer 10, and the like.

In the aforementioned illustrative embodiment, registration of the cancel record on the cancel list has been described as an example of the cancel notification. However, the cancel notification is not limited to the example. As an example, the driver program 66 of the information processing terminal 50 may transmit list request information that requests the printer 10 to transmit the cancel list, to the printer 10 via the communication I/F 55. Further, in response to receiving the list request information from the information processing terminal 50 via the communication I/F 25, the controller 30 of the printer 10 may transmit the cancel list to the information processing terminal 50 via the communication I/F 25. As another example, in S92, the controller 30 may broadcast cancel information including the terminal ID and the first authentication information to the communication network 100 via the communication I/F 55. Then, in response to receiving the cancel information including the terminal ID of the information processing terminal 50 via the communication I/F 55, the driver program 66 may set the first value "ON" for the cancel flag.

In the aforementioned illustrative embodiment, a combination of the terminal ID and the first authentication information has been described as an example of the job identification information. Nonetheless, the job identification information is not limited to the example and may include any value as long as it is a common value among a plurality of pieces of instruction information transmitted from the information processing terminal 50 to the printer 10. For example, the job identification information may be a combination of the job ID generated in S64 and the terminal ID. Alternatively, the job identification information may include an ID generated separately from the job ID.

In the aforementioned illustrative embodiment, an example has been described in which each of the aforementioned various processes is executed by a processor (e.g., the CPU 31 and the CPU 61) executing a corresponding one of various programs (e.g., the computer programs 32A, the OS 64, the edit program 65, and the driver program 66) stored in a computer-readable storage medium (e.g., the ROM 32 and the memory 62) of the printer 10 or the information processing terminal 50. Nonetheless, each process may be executed in whole or part by one or more hardware elements (e.g., one or more processors, one or more ASICs, and a combination of one or more processors and one or more ASICs) in cooperation with each other. Namely, a controller according to aspects of the present disclosure may include one or more processors, one or more ASICs, or a combination of one or more processors and one or more ASICs.

Further, aspects of the present disclosure may be achieved not only as the printer 10 or the information processing terminal 50 but also as computer-readable instructions that cause the printer 10 or the information processing terminal 50 to perform each of the aforementioned various processes. The computer-readable instructions may be provided in a form stored in non-transitory computer-readable media. The non-transitory computer-readable media may include, but are not limited to, RAMs, ROMs, flash memories, EEPROMs, CD-media, DVD-media, temporary storage, hard disk drives, floppy drives, permanent storage, and a storage device connected with a server that is connectable with the printer 10 and the information processing terminal 50 via a communication network. The computer-readable instructions stored in the storage device connected with the server may be delivered as information or signals representing the instructions via a communication network such as the Internet.

What is claimed is:

1. A printing system comprising:

a printer; and a non-transitory computer-readable medium storing computer-readable instructions that are executable by a processor connected with a first communication interface, the instructions being configured to, when executed by the processor, cause the processor to perform:

a preparation instruction process comprising transmitting preparation instruction information to the printer via the first communication interface, the preparation instruction information comprising information that instructs the printer to perform a pre-printing operation, the pre-printing operation being an operation to be performed by the printer to print an image with particular quality on a sheet in a printing operation;

a generating process in response to performing the preparation instruction process, the generating process comprising generating print data based on image data specified by a user;

a print instruction process comprising transmitting print instruction information to the printer via the first communication interface, the print instruction information being for instructing the printer to perform the printing operation based on the generated print data; and a cancelling process in response to acquiring during the generating process a cancel notification issued by the printer, the cancelling process comprising cancelling the generating process and the print instruction process, wherein the printer comprises:

an operating unit configured to perform the pre-printing operation and the printing operation;

a second communication interface; and a controller configured to perform:

a first receiving process comprising receiving the preparation instruction information from the processor via the second communication interface, the preparation instruction not including the generated print data;

a pre-printing process in response to receiving the preparation instruction information, the pre-printing process comprising controlling the operating unit to perform the pre-printing operation;

in response to detecting a cancel trigger during the pre-printing process, perform a determining process comprising determining whether the controller has received a further piece of preparation instruction information during the pre-printing process, the cancel trigger being for cancelling an operation being performed by the printing system;

in response to determining that the controller has received the further piece of preparation instruction information during the pre-printing process, continue to perform the pre-printing process;

a second receiving process comprising receiving the print instruction information from the processor via the second communication interface;

a print process in response to receiving the print instruction information and terminating the pre-printing process, the print process occurring after the pre-printing process and comprising controlling the operating unit to perform the printing operation in accordance with the print instruction information;

an issuance process in response to detecting the cancel trigger, the issuance process comprising issuing the cancel notification; and a pre-printing cancelling process in response to detecting the cancel trigger during the pre-printing process and determining that the controller has not received the further piece of preparation instruction information during the pre-printing process, the pre-printing cancelling process comprising cancelling the pre-printing process.

2. The printing system according to claim 1, wherein the controller of the printer is further configured to, in response to detecting the cancel trigger during the print process, perform a print cancelling process comprising cancelling the print process.

3. The printing system according to claim 1, wherein the printer further comprises an input interface, and wherein the controller of the printer is further configured to perform:

an accepting process comprising accepting via the input interface a cancelling operation to cancel an operation being performed by the printing system; and the issuance process in response to detecting, as the cancel trigger, the acceptance of the cancelling operation via the input interface.

4. The printing system according to claim 1, wherein the preparation instruction information and the print instruction information include same job identification information, wherein the printer further comprises a memory, and wherein the controller of the printer is further configured to:

in the issuance process, store into the memory the job identification information included in the preparation instruction information;

in response to receiving the print instruction information, perform a job cancellation determining process comprising determining whether the job identification information included in the print instruction information is stored in the memory;

in response to determining that the job identification information included in the print instruction information is not stored in the memory, perform the print process in accordance with the print instruction information; and in response to determining that the job identification information included in the print instruction information is stored in the memory, not perform the print process in accordance with the print instruction information.

5. The printing system according to claim 4, wherein the job identification information includes first authentication information representing that the processor is authorized to instruct the printer to perform the printing operation, and wherein the controller is further configured to perform:

an authentication determining process in response to receiving the preparation instruction information, the authentication determining process comprising determining whether the first authentication information included in the preparation instruction information is identical to second authentication information stored in the memory;

the pre-printing process in response to determining that the first authentication information included in the preparation instruction information is identical to the second authentication information stored in the memory; and the issuance process in response to detecting, as the cancel trigger, determining that the first authentication information included in the preparation instruction information is not identical to the second authentication information stored in the memory.

6. The printing system according to claim 4,
wherein the job identification information includes device identification information for identifying the processor that is a sending source of the job identification information, and
wherein the controller is further configured to, in the issuance process performed in response to detecting the cancel trigger during the print process or the pre-printing process, issue the cancel notification to the processor identified by the device identification information included in the preparation instruction information or the print instruction information.

7. The printing system according to claim 6,
wherein the printer further comprises a display and an input interface, and
wherein the controller is further configured to perform:
 a display process in response to detecting the cancel trigger, the display process comprising controlling the display to display the device identification information;
 a second accepting process comprising accepting via the input interface a selecting operation to select whether to issue the cancel notification to the processor identified by the device identification information displayed in the display process; and
 the issuance process in response to accepting the selecting operation.

8. The printing system according to claim 1,
wherein the computer-readable instructions are further configured to, when executed by the processor, cause the processor to:
 when the image data specified by the user contains images to be printed on N pages, repeatedly perform the generating process and the print instruction process for each of the N pages, N being an integer equal to or more than two; and
 in the cancelling process performed in response to acquiring the cancel notification during the generating process for a M-th page, cancel the generating process and the print instruction process for each page from the M-th page to the N-th page, M being an integer less than N.

9. A printer comprising:
an operating unit configured to perform a pre-printing operation and a printing operation, the pre-printing operation being an operation to be performed to print an image with particular quality on a sheet in the printing operation;
a communication interface; and
a controller configured to perform:
 a first receiving process comprising receiving preparation instruction information from an information processing device via the communication interface, the preparation instruction information comprising information that instructs the printer to perform the pre-printing operation, the preparation instruction information not including print data required for an associated print process;

a pre-printing process in response to receiving the preparation instruction information, the pre-printing process comprising controlling the operating unit to perform the pre-printing operation;
 in response to detecting a cancel trigger during the pre-printing process, perform a determining process comprising determining whether the controller has received a further piece of preparation instruction information during the pre-printing process, the cancel trigger being for cancelling an operation in execution;
 in response to determining that the controller has received the further piece of preparation instruction information during the pre-printing process, continue to perform the pre-printing process;
 a second receiving process comprising receiving print instruction information from the information processing device via the communication interface, the print instruction information being for instructing the printer to perform the printing operation based on print data;
 a print process in response to receiving the print instruction information and terminating the pre-printing process, the print process occurring after the pre-printing process and comprising controlling the operating unit to perform the printing operation in accordance with the print instruction information;
 an issuance process in response to detecting the cancel trigger, the issuance process comprising issuing a cancel notification; and
 a pre-printing cancelling process in response to detecting the cancel trigger during the pre-printing process and determining that the controller has not received a further piece of preparation instruction information during the pre-printing process, the pre-printing cancelling process comprising cancelling the pre-printing process.

10. The printer according to claim 9,
wherein the controller is further configured to, in response to detecting the cancel trigger during the print process, perform a print cancelling process comprising cancelling the print process.

11. The printer according to claim 9,
wherein the printer further comprises an input interface, and
wherein the controller is further configured to perform:
 an accepting process comprising accepting via the input interface a cancelling operation to cancel an operation in execution; and
 the issuance process in response to detecting, as the cancel trigger, the acceptance of the cancelling operation via the input interface.

12. The printer according to claim 9,
wherein the preparation instruction information and the print instruction information include same job identification information,
wherein the printer further comprises a memory, and
wherein the controller of the printer is further configured to:
 in the issuance process, store into the memory the job identification information included in the preparation instruction information;
 in response to receiving the print instruction information, perform a job cancellation determining process comprising determining whether the job identification information included in the print instruction information is stored in the memory;

in response to determining that the job identification information included in the print instruction information is not stored in the memory, perform the print process in accordance with the print instruction information; and in response to determining that the job identification information included in the print instruction information is stored in the memory, not perform the print process in accordance with the print instruction information.

13. The printer according to claim 12, wherein the job identification information includes first authentication information representing that the information processing device is authorized to instruct the printer to perform the printing operation, and wherein the controller is further configured to perform:

an authentication determining process in response to receiving the preparation instruction information, the authentication determining process comprising determining whether the first authentication information included in the preparation instruction information is identical to second authentication information stored in the memory;

the pre-printing process in response to determining that the first authentication information included in the preparation instruction information is identical to the second authentication information stored in the memory; and the issuance process in response to detecting, as the cancel trigger, determining that the first authentication information included in the preparation instruction information is not identical to the second authentication information stored in the memory.

14. The printer according to claim 12, wherein the job identification information includes device identification information for identifying the information processing device that is a sending source of the job identification information, and wherein the controller is further configured to, in the issuance process performed in response to detecting the cancel trigger during the print process or the pre-printing process, issue the cancel notification to the information processing device identified by the device identification information included in the preparation instruction information or the print instruction information.

15. The printer according to claim 14, wherein the printer further comprises a display and an input interface, and wherein the controller is further configured to perform:

a display process in response to detecting the cancel trigger, the display process comprising controlling the display to display the device identification information;

a second accepting process comprising accepting via the input interface a selecting operation to select whether to issue the cancel notification to the information processing device identified by the device identification information displayed in the display process; and the issuance process in response to accepting the selecting operation.

16. A printing system comprising:

a printer including a memory; and a non-transitory computer-readable medium storing computer-readable instructions that are executable by a processor connected with a first communication interface, the instructions being configured to, when executed by the processor, cause the processor to perform:

a preparation instruction process comprising transmitting preparation instruction information to the printer via the first communication interface, the preparation instruction information comprising information that instructs the printer to perform a pre-printing operation, the pre-printing operation being an operation to be performed by the printer to print an image with particular quality on a sheet in a printing operation;

a generating process in response to performing the preparation instruction process, the generating process comprising generating print data based on image data specified by a user;

a print instruction process comprising transmitting print instruction information to the printer via the first communication interface, the print instruction information being for instructing the printer to perform the printing operation based on the generated print data; and a cancelling process in response to acquiring during the generating process a cancel notification issued by the printer, the cancelling process comprising cancelling the generating process and the print instruction process, wherein the printer comprises:

an operating unit configured to perform the pre-printing operation and the printing operation;

a second communication interface; and a controller configured to perform:

a first receiving process comprising receiving the preparation instruction information from the processor via the second communication interface, the preparation instruction information not including the generated print data;

a pre-printing process in response to receiving the preparation instruction information, the pre-printing process comprising controlling the operating unit to perform the pre-printing operation;

a second receiving process comprising receiving the print instruction information from the processor via the second communication interface;

a print process in response to receiving the print instruction information and terminating the pre-printing process, the print process occurring after the pre-printing process and comprising controlling the operating unit to perform the printing operation in accordance with the print instruction information; and an issuance process in response to detecting a cancel trigger for cancelling an operation being performed by the printing system, the issuance process comprising issuing the cancel notification;

wherein the preparation instruction information and the print instruction information include same job identification information, and wherein the controller of the printer is further configured to:

in the issuance process, store into the memory the job identification information included in the preparation instruction information;

in response to receiving the print instruction information, perform a job cancellation determining process comprising determining whether the job identification information included in the print instruction information is stored in the memory;

in response to determining that the job identification information included in the print instruction information is not stored in the memory, perform the print process in accordance with the print instruction information; and in response to determining that the job identification information included in the print instruction information is stored in the memory, not perform the print process in accordance with the print instruction information;

wherein the job identification information includes first authentication information representing that the processor is authorized to instruct the printer to perform the printing operation, and wherein the controller is further configured to perform:
an authentication determining process in response to receiving the preparation instruction information, the authentication determining process comprising determining whether the first authentication information included in the preparation instruction information is identical to second authentication information stored in the memory;

the pre-printing process in response to determining that the first authentication information included in the preparation instruction information is identical to the second authentication information stored in the memory; and the issuance process in response to detecting, as the cancel trigger, determining that the first authentication information included in the preparation instruction information is not identical to the second authentication information stored in the memory.

17. A printer comprising:
an operating unit configured to perform a pre-printing operation and a printing operation, the pre-printing operation being an operation to be performed to print an image with particular quality on a sheet in the printing operation;
a memory;
a communication interface; and
a controller configured to perform:
a first receiving process comprising receiving preparation instruction information from an information processing device via the communication interface, the preparation instruction information comprising information that instructs the printer to perform the pre-printing operation and not including print data required for an associated print process;
a pre-printing process in response to receiving the preparation instruction information, the pre-printing process comprising controlling the operating unit to perform the pre-printing operation;
a second receiving process comprising receiving print instruction information from the information processing device via the communication interface, the print instruction information being for instructing the printer to perform the printing operation based on print data;
a print process in response to receiving the print instruction information and terminating the pre-printing process, the print process occurring after the pre-printing process and comprising controlling the operating unit to perform the printing operation in accordance with the print instruction information; and
an issuance process in response to detecting a cancel trigger for cancelling an operation in execution, the issuance process comprising issuing a cancel notification;

wherein the preparation instruction information and the print instruction information include same job identification information, wherein the controller of the printer is further configured to:
in the issuance process, store into the memory the job identification information included in the preparation instruction information;

in response to receiving the print instruction information, perform a job cancellation determining process comprising determining whether the job identification information included in the print instruction information is stored in the memory;

in response to determining that the job identification information included in the print instruction information is not stored in the memory, perform the print process in accordance with the print instruction information;

in response to determining that the job identification information included in the print instruction information is stored in the memory, not perform the print process in accordance with the print instruction information;

wherein the job identification information includes first authentication information representing that the information processing device is authorized to instruct the printer to perform the printing operation, and wherein the controller is further configured to perform:
an authentication determining process in response to receiving the preparation instruction information, the authentication determining process comprising determining whether the first authentication information included in the preparation instruction information is identical to second authentication information stored in the memory;

the pre-printing process in response to determining that the first authentication information included in the preparation instruction information is identical to the second authentication information stored in the memory; and the issuance process in response to detecting, as the cancel trigger, determining that the first authentication information included in the preparation instruction information is not identical to the second authentication information stored in the memory.

* * * * *